(12) United States Patent
Zhang

(10) Patent No.: US 10,827,403 B2
(45) Date of Patent: Nov. 3, 2020

(54) DATA TRANSMISSION METHOD, USER EQUIPMENT, BASE STATION, AND SYSTEM

(71) Applicant: CHINA ACADEMY OF TELECOMMUNICATIONS TECHNOLOGY, Beijing (CN)

(72) Inventor: Dajun Zhang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 50 days.

(21) Appl. No.: 16/301,427

(22) PCT Filed: Apr. 25, 2017

(86) PCT No.: PCT/CN2017/081808
§ 371 (c)(1),
(2) Date: Nov. 13, 2018

(87) PCT Pub. No.: WO2017/193807
PCT Pub. Date: Nov. 16, 2017

(65) Prior Publication Data
US 2019/0166528 A1 May 30, 2019

(30) Foreign Application Priority Data
May 13, 2016 (CN) .......................... 2016 1 0320054

(51) Int. Cl.
*H04W 36/00* (2009.01)
*H04W 24/10* (2009.01)
(Continued)

(52) U.S. Cl.
CPC ..... *H04W 36/026* (2013.01); *H04W 36/0072* (2013.01); *H04W 36/08* (2013.01)

(58) Field of Classification Search
CPC . H04W 76/15; H04W 36/0055; H04W 36/08; H04W 12/02; H04W 12/04;
(Continued)

(56) References Cited

U.S. PATENT DOCUMENTS 8,855,637 B2* 10/2014 Robbins ............ H04W 36/0094
455/436
2007/0287476 A1* 12/2007 Jeong .................... H04W 76/10
455/456.6
(Continued)

FOREIGN PATENT DOCUMENTS

CN 101048001 A 10/2007
CN 101052213 A 10/2007
(Continued)

OTHER PUBLICATIONS

First Office Action and Search Report from CN app. No. 201610320054.5, dated Jun. 14, 2019, with English translation from Global Dossier.
(Continued)

Primary Examiner — Sai Aung
(74) Attorney, Agent, or Firm — Ladas & Parry, LLP

(57) ABSTRACT

A data transmission method, a user equipment (UE), a base station and a system are provided. The method includes maintaining transmission of data of a UE by an original base station in a handover process in which the UE hands over from the original base station to a target base station; and transmitting the data to the target base station by the original base station when maintaining the transmission of the data of the UE.

16 Claims, 14 Drawing Sheets

(51) Int. Cl.
*H04W 36/02* (2009.01)
*H04W 36/08* (2009.01)

(58) Field of Classification Search
CPC .... H04W 16/14; H04W 16/32; H04L 5/0053; H04L 5/0091; H04L 1/1614; H04L 1/1685; H04L 1/1874; H04L 1/188; H04L 1/1896
See application file for complete search history.

(56) References Cited

U.S. PATENT DOCUMENTS

| | | | | |
|---|---|---|---|---|
| 2009/0122762 | A1* | 5/2009 | Kitazoe | H04W 12/04 370/331 |
| 2013/0176988 | A1* | 7/2013 | Wang | H04W 28/08 370/331 |
| 2014/0211756 | A1 | 7/2014 | Bontu et al. | |
| 2014/0308954 | A1* | 10/2014 | Wang | H04W 36/165 455/436 |
| 2015/0043435 | A1* | 2/2015 | Blankenship | H04L 69/322 370/329 |
| 2015/0271726 | A1* | 9/2015 | Kim | H04W 36/0055 370/329 |
| 2016/0174124 | A1* | 6/2016 | Basu Mallick | H04W 74/006 370/331 |
| 2017/0034054 | A1* | 2/2017 | Sukumar | H04L 45/66 |

FOREIGN PATENT DOCUMENTS

| | | |
|---|---|---|
| CN | 104469859 A | 3/2015 |
| CN | 105474696 A | 4/2016 |
| WO | 2017171506 A1 | 10/2017 |

OTHER PUBLICATIONS

Extended European Search Report from EP app. No. 17795425.2, dated Feb. 25, 2019.
International Preliminary Report on Patentability, from PCT/CN2017/081808, dated Nov. 13, 2018, with English translation from WIPO.
"Correction on usage of extended eNB UE X2AP ID", 3GPP TSG-RAN WG3 Meeting #91, St. Julian's Malta, Feb. 15-19, 2016.
International Search Report for PCT/CN2017/081808 dated Jun. 22, 2017 and its English translation provided by WIPO.
Written Opinion of the International Search Authority PCT/CN2017/081808 dated Jun. 22, 2017 and its English translation provided by WIPO.

* cited by examiner maintaining transmission of data of a UE between the UE and an original base station by the UE in a handover process in which the UE hands over from the original base station to a target base station — 401

Fig. 4 receiving, by a target base station, data of a UE transmitted from an original base station in a handover process in which the UE hands over from the original base station to the target base station — 501

Fig. 5

DATA TRANSMISSION METHOD, USER EQUIPMENT, BASE STATION, AND SYSTEM

CROSS-REFERENCE TO RELATED APPLICATIONS

The present application is a U.S. national phase application of a PCT Application No., PCT/CN2017/081808 filed on Apr. 25, 2017, which claims a priority of a Chinese patent application No. 201610320054.5 filed in China on. May 13, 2016, a disclosure of which is incorporated herein in its entirety by reference.

TECHNICAL FIELD

The present disclosure relates to a field of communication technology, and in particular, relates to a data transmission method, a User Equipment (UE), a base station and a system.

BACKGROUND

With explosive growth of mobile applications, requirements for network transmission speeds are higher and higher. Thus, a frequency band with higher frequencies and a larger bandwidth are introduced into a mobile network. However, in a current handover mechanism for a network node, when a User Equipment (UE) hands over from an original base station to a target base station, data transmission between the UE and the original base station may be discontinued, causing a latency due to the discontinued data transmission. Thus, a handover performance is lowered and a development requirement of the network cannot be satisfied.

SUMMARY

An objective of the present disclosure is to provide a data transmission method, a User Equipment (UE), a base station, and a system to solve a technical problem that a handover procedure of a network node cannot satisfy a development requirement of a network.

For achieving the above purpose, a data transmission method is provided in some embodiments of the present disclosure. The data transmission method includes maintaining transmission of data of a User Equipment (UE) by an original base station in a handover process in which the UE hands over from the original base station to a target base station; and transmitting the data to the target base station by the original base station when maintaining the transmission of the data of the UE.

Optionally, the data includes a downlink data packet, and maintaining the transmission of the data of the UE by the original base station includes: transmitting the downlink data packet to the UE by the original base station. Transmitting the data to the target base station by the original base station when maintaining the transmission of the data of the UE, includes: transmitting the downlink data packet to the target base station by the original base station when transmitting the downlink data packet to the UE.

Optionally, the method further includes transmitting a value of a current Hyperframe Number (HFN) of the downlink data packet to the target base station by the original base station.

Optionally, the data includes a uplink data packet, the maintaining transmission of data of a UE by an original base station includes: transmitting the uplink data packet to a gateway device by the original base station. Transmitting the data to the target base station by the original base station when maintaining the transmission of the data of the UE includes: transmitting the uplink data packet to the target base station by the original base station when transmitting the uplink data packet to the gateway device.

Optionally, the method further includes transmitting a value of a current Hyperframe Number (HFN) of the uplink data packet to the target base station by the original base station.

Optionally, the uplink data packet transmitted from the original base station to the target base station is used to generate a Packet Data Convergence Protocol (PDCP) status report by the target base station according to the uplink data packet received by the target base station when a connection between the target base station and the UE is established successfully, and the PDCP status report is sent to the UE by the target base station.

Optionally, the value of the HFN of the downlink data packet transmitted from the original base station to the target base station is used to determine, by the target base station according to the value of the HFN of the downlink data packet and the downlink data packet transmitted by the original base station, a value of a HFN of a subsequent downlink data packet to be transmitted to the UE.

Optionally, the value of the HFN of the uplink data packet transmitted from the original base station to the target base station is used to determine, by the target base station according to the value of the HFN of the uplink data packet and the uplink data packet transmitted by the original base station, a value of a HFN of a subsequent uplink data packet to be transmitted from the UE.

Optionally, the method further includes generating a Serial Number (SN) status report of the downlink data packet of the UE by the original base station when the original base station stops transmission of downlink data packets of the UE, and sending the SN status report to the target base station, wherein the SN status report includes information about a PDCP SN to be assigned to a downlink data packet of the UE by the target base station.

Optionally, the method further includes generating, by the original base station, a SN status report of the uplink data packet of the UE when the original base station stops transmission of uplink data packets of the UE, and sending the SN status report to the target base station, wherein the SN status report includes a receiving state of the uplink data packet of the UE and an expected value of a HFN of a uplink data packet from the UE.

Optionally, the method further includes stopping transmission of the uplink data packets of the UE to the gateway device by the original base station when the original base station stops transmission of the uplink data packets of the UE by the original base station.

Some embodiments of the present disclosure further provide a data transmission method. The data transmission method includes maintaining transmission of data of a User Equipment (UE) between an original base station and the UE by the UE in a handover process in which the UE hands over from the original base station to a target base station, wherein when the UE maintains the transmission of the data of the UE between the original base station and the UE, the original base station transmits the data of the UE to the target base station.

Optionally, the data includes a downlink data packet, maintaining the transmission of the data of the UE between the original base station and the UE by the UE includes: receiving, by the UE, the downlink data packet transmitted from the original base station, wherein the original base station transmits the downlink data packet to the target base station when the UE receives the downlink data packet transmitted from the original base station.

Optionally, the data includes a uplink data packet, maintaining the transmission of the data of the UE between the original base station and the UE by the UE, includes: transmitting, by the UE, the uplink data packet to the original base station, wherein the original base station transmits the uplink data packet to the target base station when the UE transmits the uplink data packet to the original base station.

Optionally, the method further includes receiving, by the UE, a Packet Data Convergence Protocol (PDCP) status report transmitted from the target base station, wherein the PDCP status report is generated by the target base station according to the uplink data packet received by the target base station when a connection between the UE and the target base station is established successfully.

Optionally, a value of a HFN of a subsequent downlink data packet transmitted from the target base station and received by the UE is determined by the target base station according to a value of a HFN of the downlink data packet transmitted by the original base station and the downlink data packet transmitted by the original base station.

Optionally, a value of a HFN of a subsequent uplink data packet transmitted from the UE to the target base station is determined by the target base station according to a value of a HFN of the uplink data packet transmitted by the original base station and the uplink data packet transmitted by the original base station.

Optionally, after the original base station stops transmission of downlink data packets of the UE, information about a Packet Data Convergence Protocol (PDCP) SN of the downlink data packet of the UE is included in a Serial Number (SN) status report transmitted by the original base station and received by the target base station, and is information about a PDCP SN to be assigned to a downlink data packet of the UE by the target base station.

Optionally, after the original base station stops transmission of uplink data packets of the UE, a value of a HFN of a uplink data packet of the UE is included in a SN status report transmitted by the original base station and received by the target base station, and is an expected value of a HFN of a uplink data packet from the UE, and the SN status report further includes a receiving state of the uplink data packet of the UE.

Optionally, the method further includes transmitting, to the target base station by the UE, a value of a SN and/or a value of a HFN of a current first downlink PDCP Protocol Data Unit (PDU) not received by the UE, wherein, the first downlink PDCP PDU not received by the UE is a first PDU of the UE not properly received by the UE from the original base station.

Optionally, transmitting, by the UE to the target base station, the value of the SN and/or the value of the HFN of the current first downlink PDCP PDU not received by the UE, includes: transmitting, by the UE to the target base station through a downlink PDCP status report, the value of the SN and/or the value of the HFN of the current first downlink PDCP PDU not received by the UE.

Optionally, the method further includes transmitting, to the target base station by the UE, a value of a Serial Number (SN) and/or a value of a Hyperframe Number (HFN) of a current first uplink Packet Data Convergence Protocol (PDCP) Protocol Data Unit (PDU) not acknowledged, wherein, the first uplink PDCP PDU not acknowledged is a first PDU of the UE not acknowledged by the original base station.

Optionally, transmitting, by the UE to the target base station, the value of the SN and the value of the HFN of the current first uplink PDCP PDU not acknowledged, includes: transmitting, by the UE to the target base station through a downlink PDCP status report, the value of the SN and the value of the HFN of the current first uplink PDCP PDU not acknowledged.

Some embodiments of the present disclosure provide a data transmission method. The data transmission method includes receiving, by a target base station, data of a User Equipment (UE) transmitted by an original base station in a handover process in which the UE hands over from the original base station to the target base station, wherein, the original base station maintains transmission of the data of the UE when the target base station receives the data of the UE transmitted by the original base station.

Optionally, the data includes a downlink data packet, and receiving, by the target base station, the data of the UE transmitted by the original base station, includes: receiving, by the target base station, the downlink data packet transmitted from the original base station, wherein the original base station transmits the downlink data packet to the UE when the target base station receives the downlink data packet transmitted from the original base station.

Optionally, the method further includes receiving, by the target base station, a value of a current Hyperframe Number (HFN) of the downlink data packet transmitted from the original base station.

Optionally, the data includes a uplink data packet, and receiving, by the target base station, the data of the UE transmitted by the original base station, includes: receiving, by the target base station, the uplink data packet transmitted from the original base station, wherein the original base station transmits the uplink data packet to a gateway device when the target base station receives the uplink data packet transmitted from the original base station.

Optionally, the method further includes receiving, by the target base station, a value of a current Hyperframe Number (HFN) of the uplink data packet transmitted from the original base station.

Optionally, the method further includes: generating, by the target base station according to the uplink data packet received by the target base station, a Packet Data Convergence Protocol (PDCP) status report when a connection between the UE and the target base station is established successfully, and sending the PDCP status report to the UE.

Optionally, the method further includes determining, by the target base station according to a value of a HFN of the downlink data packet transmitted from the original base station and the downlink data packet transmitted from the original base station, a value of a HFN of a subsequent downlink data packet to be transmitted to the UE.

Optionally, the method further includes determining, by the target base station according to a value of a HFN of the uplink data packet transmitted from the original base station and the uplink data packet transmitted from the original base station, a value of a HFN of a subsequent uplink data packet to be transmitted from the UE.

Optionally, the method further includes receiving, by the target base station, a Serial Number (SN) status report sent from the original base station when the original base station stops transmission of downlink data packets of the UE, wherein the SN status report is a SN status report of the downlink data packet of the UE generated by the original base station, and includes information about a PDCP SN of a downlink data packet of the UE to be assigned by the target base station.

Optionally, the method further includes receiving, by the target base station, a SN status report transmitted from the original base station when the original base station stops transmission of uplink data packets of the UE, wherein the SN status report is a SN status report of the uplink data packet of the UE generated by the original base station, and includes a receiving state of the uplink data packet of the UE and an expected value of a HFN of a uplink data packet from the UE.

Optionally, the method further includes receiving, by the target base station from the UE, a value of a Serial Number (SN) and/or a value of a Hyperframe Number (HFN) of a current first downlink PDCP PDU not received by the UE, wherein the first downlink PDCP PDU not received by the UE is a first PDU not received by the UE after a connection between the UE and the target base station is successfully established.

Optionally, receiving, by the target base station from the UE, the value of the SN and/or the value of the HFN of the current first downlink PDCP PDU not received by the UE, includes: receiving, by the target base station from a downlink PDCP status report transmitted by the UE, the value of the SN and/or the value of the HFN of the current first downlink PDCP PDU not received by the UE.

Optionally, the method further includes receiving, by the target base station from the UE, a value of a SN and/or a value of a HFN of a current first uplink PDCP PDU not acknowledged, wherein, the first uplink PDCP PDU not acknowledged is a first PDU of the UE not acknowledged by the original base station.

Optionally, receiving, by the target base station from the UE, the value of the SN and/or the value of the HFN of the current first uplink PDCP PDU not acknowledged, includes: receiving, by the target base station from a downlink PDCP status report transmitted from the UE, the value of the SN and/or the value of the HFN of the current first uplink PDCP PDU not acknowledged.

Some embodiments of the present disclosure further provide a base station. The base station is an original base station and includes a first transmission module configured to maintain transmission of data of a User Equipment (UE) in a handover process in which the UE hands over from the original base station to a target base station; and a second transmission module configured to transmit the data to the target base station when maintaining the transmission of the data of the UE.

Optionally, the data includes a downlink data packet, the first transmission module is configured to transmit the downlink data packet to the UE; the second transmission module is configured to transmit the downlink data packet to the target base station when transmitting the downlink data packet to the UE.

Optionally, the base station further includes a third transmission module configured to transmit a value of a current Hyperframe Number (HFN) of the downlink data packet to the target base station.

Optionally, the data includes a uplink data packet, the first transmission module is configured to transmit the uplink data packet to a gateway device; the second transmission module is configured to transmitting the uplink data packet to the target base station when transmitting the uplink data packet to the gateway device.

Optionally, the base station further includes a fourth transmission module configured to transmit a value of a current Hyperframe Number (HFN) of the uplink data packet to the target base station.

Optionally, the uplink data packet transmitted from the original base station to the target base station is used to generate a Packet Data Convergence Protocol (PDCP) status report by the target base station according to the uplink data packet received by the target base station when a connection between the target base station and the UE is established successfully, and the PDCP status report is sent to the UE by the target base station.

Optionally, the value of the HFN of the downlink data packet transmitted from the original base station to the target base station is used to determine, by the target base station according to the value of the HFN of the downlink data packet and the downlink data packet transmitted by the original base station, a value of a HFN of a subsequent downlink data packet to be transmitted to the UE.

Optionally, the value of the HFN of the uplink data packet transmitted from the original base station to the target base station is used to determine, by the target base station according to the value of the HFN of the uplink data packet and the uplink data packet transmitted by the original base station, a value of a HFN of a subsequent uplink data packet to be transmitted from the UE.

Optionally, the base station further includes a fifth transmission module configured to generate a Serial Number (SN) status report of the downlink data packet of the UE when the original base station stops transmission of downlink data packets of the UE, and transmit the SN status report to the target base station, wherein the SN status report includes information about a PDCP SN to be assigned to a downlink data packet of the UE by the target base station.

Optionally, the base station further includes a sixth transmission module configured to generate a SN status report of the uplink data packet of the UE when the original base station stops transmission of uplink data packets of the UE, and transmit the SN status report to the target base station, wherein the SN status report includes a receiving state of the uplink data packet of the UE and an expected value of a HFN of a uplink data packet from the UE.

Optionally, the base station further includes a stop module configured to stop transmission of uplink data packets of the UE to the gateway device when the original base station stops transmission of the uplink data packets of the UE by the original base station.

Some embodiments of the present disclosure further provides a User Equipment (UE). The UE includes a first transmission module configured to maintain transmission of data of the between an original base station and the UE by the UE in a handover process in which the UE hands over from the original base station to a target base station, wherein when the UE maintains the transmission of the data of the UE between the original base station and the UE, the original base station transmits the data of the UE to the target base station.

Optionally, the data includes a downlink data packet, wherein the first transmission module is configured to receive the downlink data packet transmitted from the original base station, wherein the original base station transmits the downlink data packet to the target base station when the UE receives the downlink data packet transmitted from the original base station.

Optionally, the data includes a uplink data packet, wherein the first transmission module is configured to transmit the uplink data packet to the original base station, wherein the original base station transmits the uplink data packet to the target base station when the UE transmits the uplink data packet to the original base station.

Optionally, the UE further includes a receiving module configured to receive a Packet Data Convergence Protocol (PDCP) status report transmitted from the target base station, wherein the PDCP status report is generated by the target base station according to the uplink data packet received by the target base station when a connection between the UE and the target base station is established successfully.

Optionally, a value of a HFN of a subsequent downlink data packet transmitted from the target base station and received by the UE is determined by the target base station according to a value of a HFN of the downlink data packet transmitted by the original base station and the downlink data packet transmitted by the original base station.

Optionally, a value of a HFN of a subsequent uplink data packet transmitted from the UE to the target base station is determined by the target base station according to a value of a HFN of the uplink data packet transmitted by the original base station and the uplink data packet transmitted by the original base station.

Optionally, after the original base station stops transmission of downlink data packets of the UE, information about a Packet Data Convergence Protocol (PDCP) Serial Number (SN) of the downlink data packet of the UE is included in a SN status report transmitted by the original base station and received by the target base station, and is information about a PDCP SN to be assigned to a downlink data packet of the UE by the target base station.

Optionally, after the original base station stops transmission of uplink data packets of the UE, a value of a Hyperframe Number (HFN) of a uplink data packet of the UE is included in a Serial Number (SN) status report transmitted by the original base station and received by the target base station, and is an expected value of a HFN of a uplink data packet from the UE, and the SN status report further includes a receiving state of the uplink data packet of the UE.

Optionally, the UE further includes a second transmission module configured to transmit, to the target base station, a value of a SN and/or a value of a HFN of a current first downlink PDCP Protocol Data Unit (PDU) not received by the UE, wherein, the first downlink PDCP PDU not received by the UE is a first PDU of the UE not properly received by the UE from the original base station.

Optionally, the second transmission module is configured to transmit, to the target base station through a downlink PDCP status report, the value of the SN and/or the value of the HFN of the current first downlink PDCP PDU not received by the UE.

Optionally, the UE further includes a third transmission module configured to transmit, to the target base station, a value of a Serial Number (SN) and/or a value of a Hyperframe Number (HFN) of a current first uplink Packet Data Convergence Protocol (PDCP) Protocol Data Unit (PDU) not acknowledged, wherein, the first uplink PDCP PDU not acknowledged is a first PDU of the UE not acknowledged by the original base station.

Optionally, the third transmission module is configured to transmit, to the target base station through a downlink PDCP status report, the value of the SN and the value of the HFN of the current first uplink PDCP PDU not acknowledged.

Some embodiments of the present disclosure provide a base station. The base station is a target base station and includes a first receiving module configured to receive data of a User Equipment (UE) transmitted by an original base station in a handover process in which the UE hands over from the original base station to the target base station, wherein, the original base station maintains transmission of the data of the UE when the target base station receives the data of the UE transmitted by the original base station.

Optionally, the UE further includes, the data includes a downlink data packet, and the first receiving module is configured to receive the downlink data packet transmitted from the original base station, wherein the original base station transmits the downlink data packet to the UE when the target base station receives the downlink data packet transmitted from the original base station.

Optionally, the base station further includes a second receiving module configured to receive a value of a current Hyperframe Number (HFN) of the downlink data packet transmitted from the original base station.

Optionally, the data includes a uplink data packet, and the first receiving module is further configured to receive the uplink data packet transmitted from the original base station, wherein the original base station transmits the uplink data packet to a gateway device when the target base station receives the uplink data packet transmitted from the original base station.

Optionally, the base station further includes a third receiving module configured to receive a value of a current Hyperframe Number (HFN) of the uplink data packet transmitted from the original base station.

Optionally, the base station further includes a transmission module configured to generate, according to the uplink data packet received by the target base station, a Packet Data Convergence Protocol (PDCP) status report when a connection between the UE and the target base station is established successfully, and send the PDCP status report to the UE.

Optionally, the base station further includes a first determination module configured to determine, according to a value of a HFN of the downlink data packet transmitted from the original base station and the downlink data packet transmitted from the original base station, a value of a HFN of a subsequent downlink data packet to be transmitted to the UE.

Optionally, the base station further includes a second determination module configured to determine, according to a value of a HFN of the uplink data packet transmitted from the original base station and the uplink data packet transmitted from the original base station, a value of a HFN of a subsequent uplink data packet to be transmitted from the UE.

Optionally, the base station further includes a fourth receiving module configured to receive a Serial Number (SN) status report sent from the original base station when the original base station stops transmission of downlink data packets of the UE, wherein the SN status report is a SN status report of the downlink data packet of the UE generated by the original base station, and includes information about a PDCP SN of a downlink data packet of the UE to be assigned by the target base station.

Optionally, the base station further includes a fifth receiving module configured to receive a SN status report transmitted from the original base station when the original base station stops transmission of uplink data packets of the UE, wherein the SN status report is a SN status report of the uplink data packet of the UE generated by the original base station, and includes a receiving state of the uplink data packet of the UE and an expected value of a HFN of a uplink data packet from the UE.

Optionally, the base station further includes a sixth receiving module configured to receive, from the UE, a value of a Serial Number (SN) and/or a value of a Hyperframe Number (HFN) of a current first downlink PDCP PDU not received by the UE, wherein the first downlink PDCP PDU not received by the UE is a first PDU not received by the UE after a connection between the UE and the target base station is successfully established.

Optionally, the sixth receiving module is configured to receive, from a downlink PDCP status report transmitted by the UE, the value of the SN and/or the value of the HFN of the current first downlink PDCP PDU not received by the UE.

Optionally, the base station further includes a seventh receiving module configured to receive, from the UE, a value of a SN and/or a value of a HFN of a current first uplink PDCP PDU not acknowledged, wherein, the first uplink PDCP PDU not acknowledged is a first PDU of the UE not acknowledged by the original base station.

Optionally, the seventh receiving module is configured to receive, from a downlink PDCP status report transmitted from the UE, the value of the SN and/or the value of the HFN of the current first uplink PDCP PDU not acknowledged.

Some embodiments of the present disclosure further provide a data transmission system. The data transmission system includes an original base station, a User Equipment (UE), and a target base station. The original base station is configured to maintain transmission of data of the UE in a handover process in which the UE hands over from the original base station to the target base station; the UE is configured to maintain the transmission of the data of the UE between the original base station and the UE in the handover process in which the UE hands over from the original base station to the target base station, wherein the original base station is further configured to transmit the data to the target base station when maintaining the transmission of the data of the UE; and the target base station is configured to receive the data of the UE transmitted by the original base station in the handover process in which the UE hands over from the original base station to the target base station.

Technical solutions of the present disclosure have at least the following advantages: in the handover process in which the UE hands over from the original bases station to the target base station, the original base station maintains the transmission of the data of the UE; and when maintaining the transmission of the data of the UE, the original base station transmits the data to the target base station; in this way, when the UE hands over from the original base station to the target base station, the original base station maintains the transmission of the data of the UE and transmits the data to the target base station. Therefore, a discontinuation period of the transmission of the data of the UE may be shortened, a handover performance may be enhanced, and a development requirement of a network may be satisfied.

BRIEF DESCRIPTION OF THE DRAWINGS

FIG. 4 is a flowchart of another example of a data transmission method provided in some embodiments of the present disclosure;

FIG. 5 is a flowchart of another example of a data transmission method provided in some embodiments of the present disclosure;

DETAILED DESCRIPTION

To make technical problems to be solved, technical solutions, and advantages of the present disclosure more clear, specific embodiments of the present disclosure will be described hereinafter in details in combination with drawings.

Figure 1:
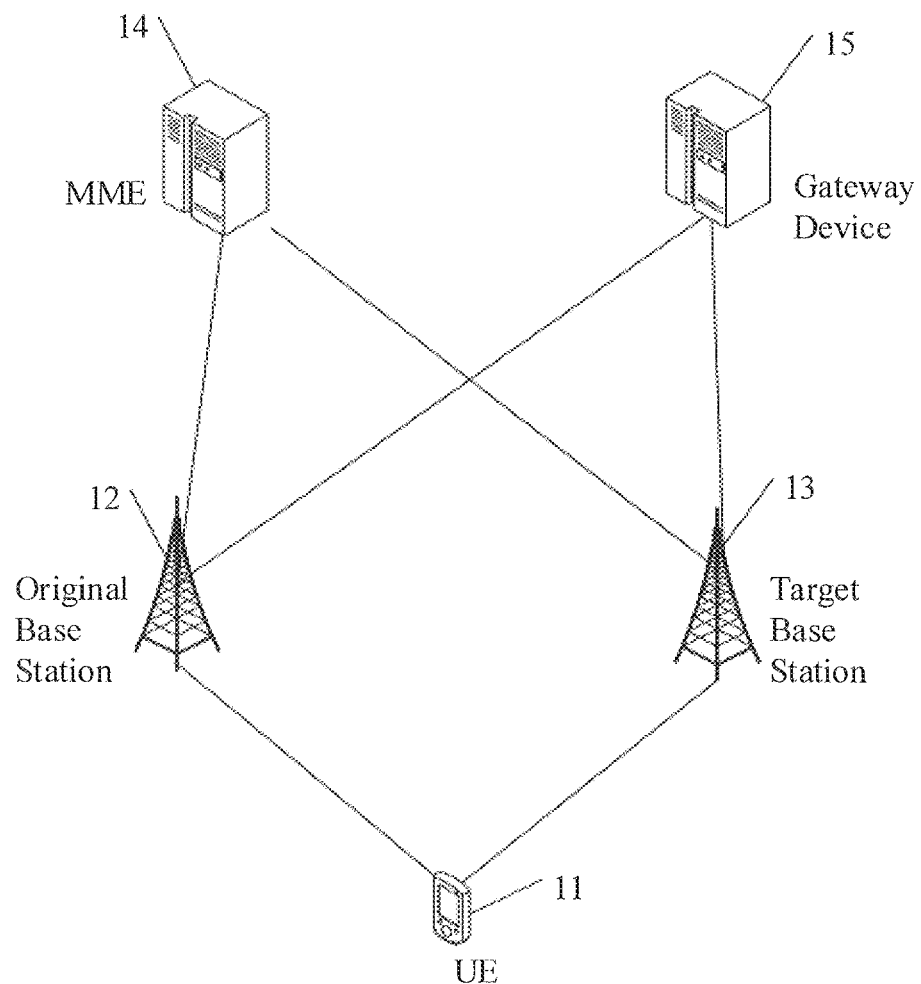
FIG. 1 is a schematic diagram of an example of a network structure in which a data transmission method provided in some embodiments of the present disclosure is applicable.

Referring to FIG. 1, FIG. 1 is a schematic diagram of an example of a network structure in which a data transmission method provided in some embodiments of the present disclosure is applicable. FIG. 1 shows a User Equipment (UE) 11, an original base station 12, a target base station 13, a Mobility Management Entity (MME) 14, and a gateway device 15. The UE 11 may be a terminal such as a cellular phone, a Tablet Personal Computer, a Laptop Computer, a Personal Digital Assistance (PDA), a Mobile Internet Device (MID) or a Wearable Device. It is noted that the UE 11 is not limited to a specific type of terminal in the present disclosure. The UE 11 may communicate with the original base station 12 and may communication with the target base station 13. The original base station 12 may be an evolved Node B (eNB) or another kind of base station. It is noted that the original base station 12 in the embodiments of the present disclosure is not limited to a specific type of base station. Similarly, the target base station 13 may also an evolved Node B (eNB) or another kind of base station. It is noted that the target base station 13 is not limited to a specific type of base station in the present disclosure. Additionally, the original base station 12 and the target base station 13 may also communicate with the MME 14 and the gateway device 15. The gateway device 15 may be a Serving Gateway (S-GW). It is noted that the gateway device 15 is not limited to a specific type of gateway device in the present disclosure.

Figure 2:
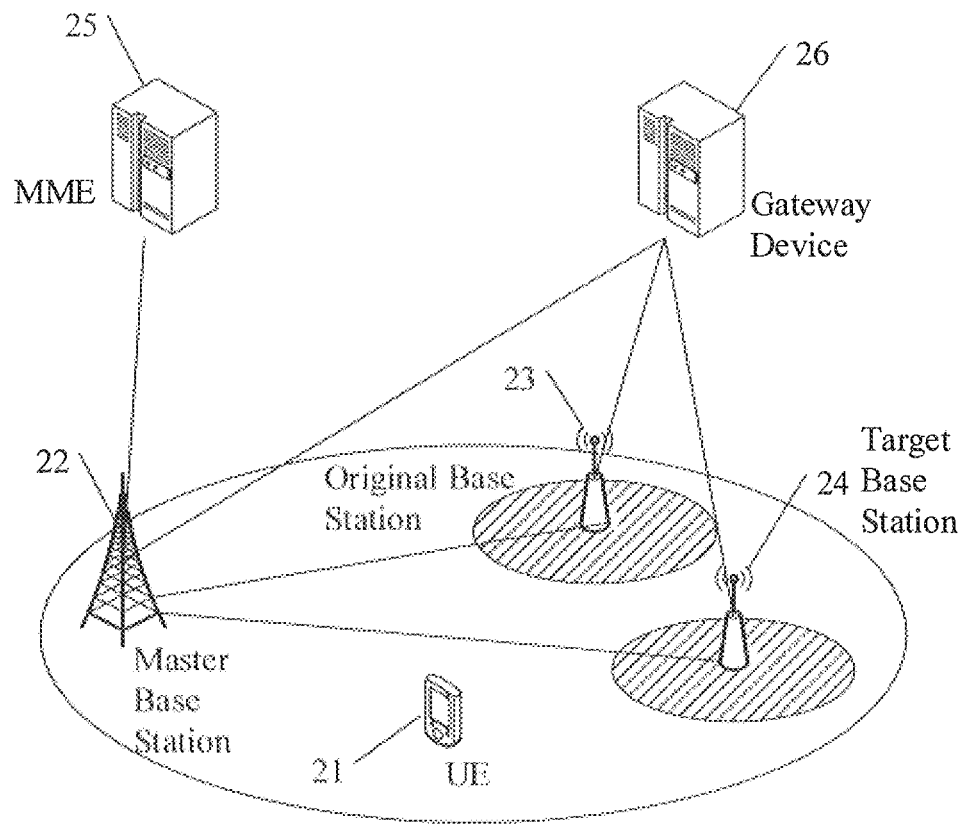
FIG. 2 is a schematic diagram of another example of a network structure in which a data transmission method provided in some embodiments of the present disclosure is applicable.

Referring to FIG. 2, FIG. 2 is a schematic diagram of another example of a network structure in which a data transmission method provided in some embodiments of the present disclosure is applicable. FIG. 2 shows a UE 21, a master base station 22, an original base station 23, a target base station 24, a MME 25, and a gateway device 26. The UE 21 may be a terminal such as a cellular phone, a Tablet Personal Computer, a Laptop Computer, a Personal Digital Assistance (PDA), a Mobile Internet Device (MID) or a Wearable Device. It is noted that the UE 21 is not limited to a specific type of terminal in the present disclosure. The UE 21 may communicate with the master base station 22, the original base station 23, and the target base station 24. The master base station 23 may be a master eNB (MeNB), and the original base station 23 and the target base station 24 may be a Secondary eNB (SeNB). Additionally, in this network structure, the UE 21 may have two user-plane architectures. One of the two user-plane architectures is a 1A architecture, in which a bearer in the SeNB is directly connected to a Core Network (CN). The other of the two user-plane architectures is a 3C architecture, in which a bearer in the SeNB only maintains functions of a Radio Link Control (RLC) layer, a Medium Access Control (MAC) layer and a Physical (PHY) layer and is connected to the CN through a Packet Data Convergence Protocol (PDCP) layer of the MeNB. Similarly, the gateway device 26 may be a Serving Gateway (S-GW). It is noted that the gateway device 26 is not limited to a specific type of gateway device in the present disclosure.

It is noted that the data transmission method provided in some embodiments of the present disclosure is not only applicable to the network structures in FIG. 1 and FIG. 2, but also applicable to other network structures. Applicability of the data transmission method in the present disclosure is not limited herein.

Figure 3:
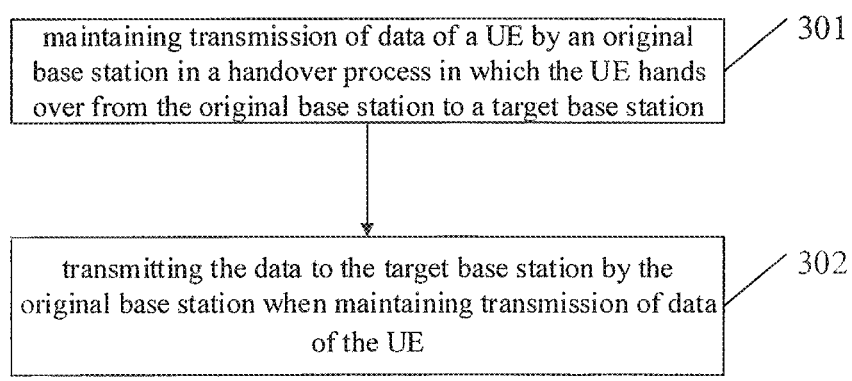
FIG. 3 is a flowchart of an example of a data transmission method provided in some embodiments of the present disclosure.
Figure 6:
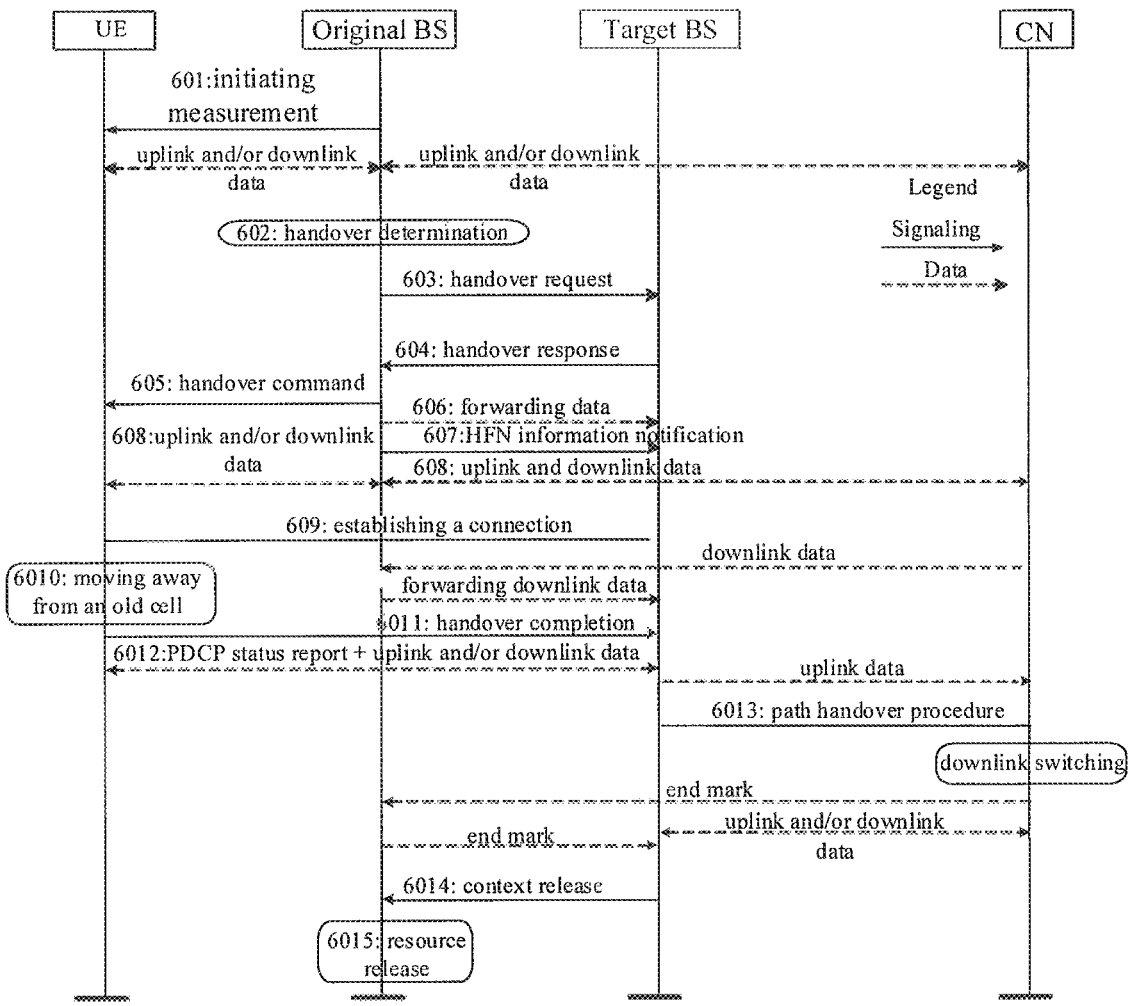
FIG. 6 is a flowchart of an example of a data transmission method provided in some embodiments of the present disclosure.
Figure 7:
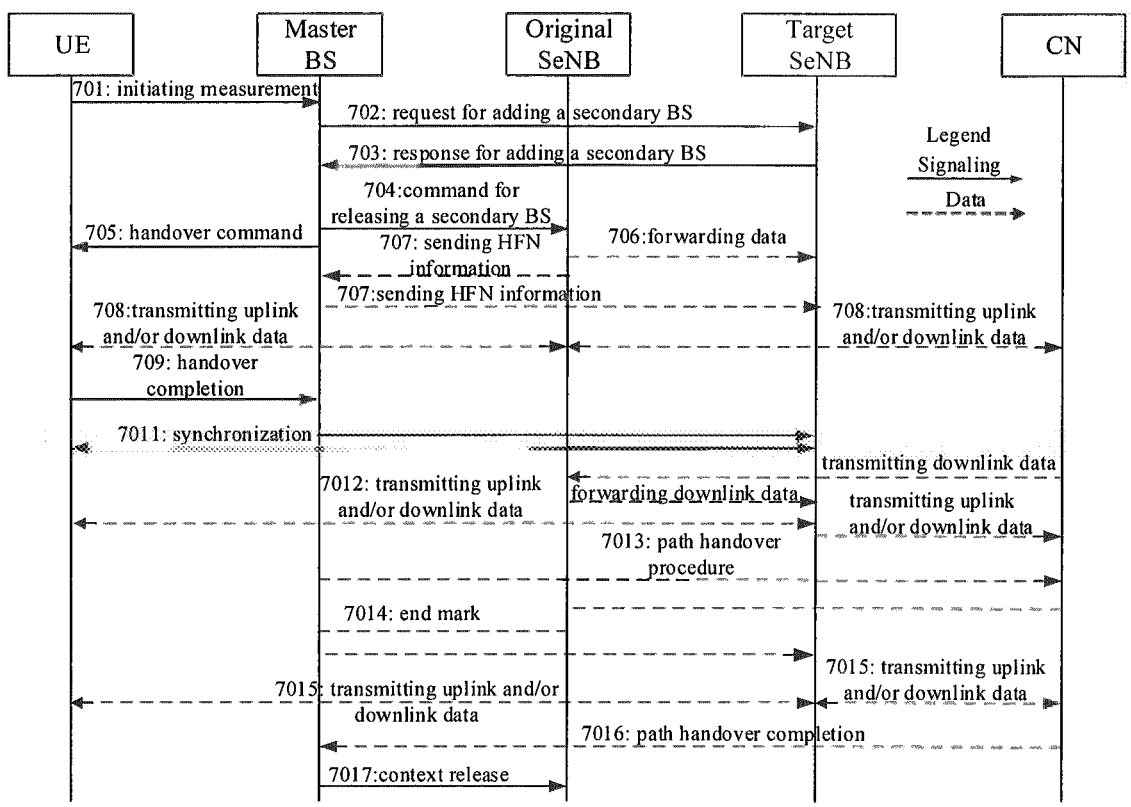
FIG. 7 is a flowchart of another example of a data transmission method provided in some embodiments of the present disclosure.
Figure 8:
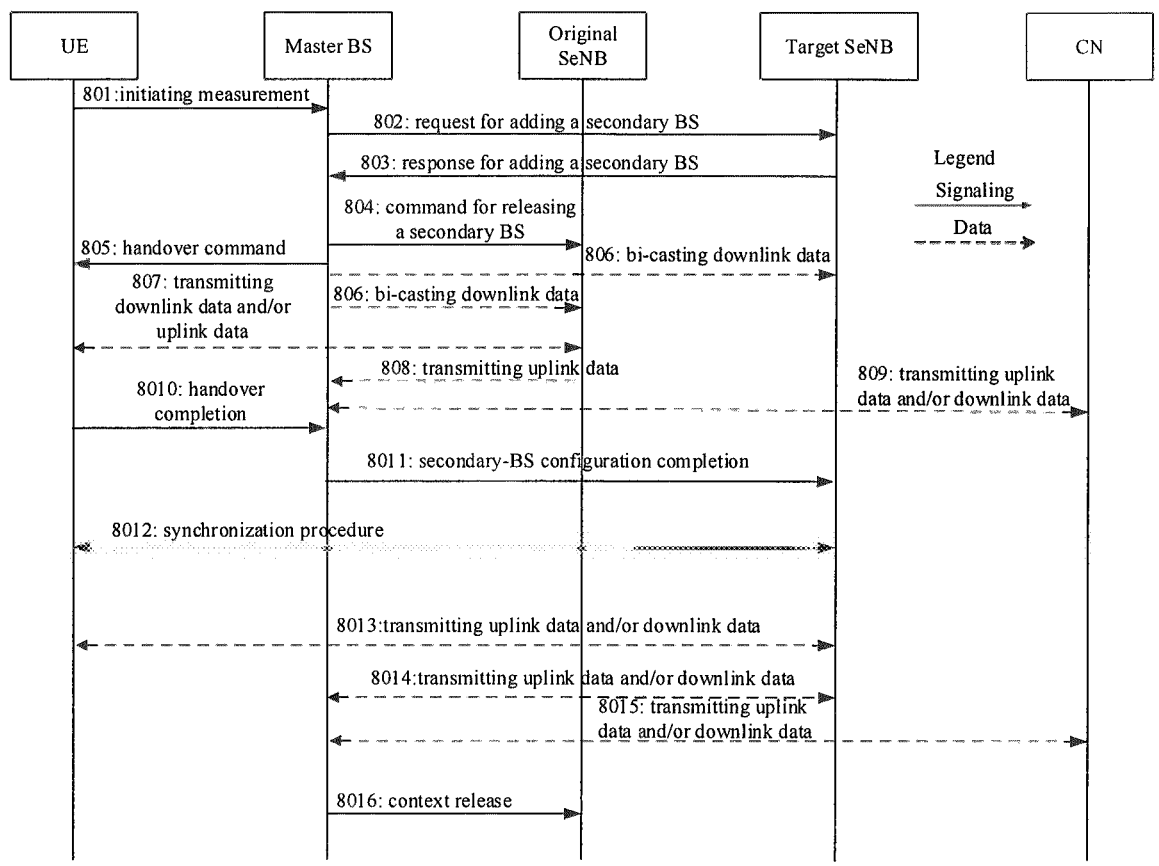
FIG. 8 is a flowchart of another example of a data transmission method provided in some embodiments of the present disclosure.

Referring to FIG. 3, FIG. 3 is a flowchart of an example of a data transmission method provided in some embodiments of the present disclosure. As shown in FIG. 3, the example of the data transmission method includes steps 301 and 302.

Step 301: maintaining transmission of data of a UE by an original base station in a handover process in which the UE hands over from the original base station to a target base station.

Step 302: transmitting the data to the target base station by the original base station when maintaining transmission of data of the UE.

In the embodiment, maintaining the transmission of the data of the UE by the original base station may be understood as maintaining air-interface transmission of at least one of uplink data or downlink data by the original base station through air-interfaces of the original base station. For example, the original base station maintains transmission of the uplink data through the air-interfaces of the original base station and transmission of the downlink data through the air-interfaces of the original base station. The transmitting the data to the target base station by the original base station when maintaining the transmission of the data of the UE may be understood as transmitting the data to the target base station by the original base station when maintaining the transmission of the data of the UE. In this way, in the handover process in which the UE hands over from the original base station to the target base station, the original base station maintains the transmission of the data of the UE and transmits the data to the target base station. Therefore, a discontinuation period of the transmission of the data of the UE may be shortened, a handover performance may be enhanced, and a development requirement of the network may be satisfied. Additionally, the handover process in which the UE hands over from the original base station to the target base station may include a sub-process in which the UE establishes a connection with the target base station, and a sub-process in which the original base station sends a handover command to the UE. Sub-processes included are not specified limited herein.

Optionally, the data described above may include a downlink data packet. Maintaining the transmission of the data of the UE by the original base station may include transmitting the downlink data packet to the UE by the original base station.

Transmitting the data to the target base station by the original base station when maintaining the transmission of the data of the UE may include transmitting the downlink data packet to the target base station by the original base station when transmitting the downlink data packet to the UE.

In this embodiment, in the handover process, the original base station transmits the downlink data packet to the target base station when the original base station transmits the downlink data packet to the UE. For example, on one hand, the original base station continues performing the air-interface transmission of downlink data, and on the other hand, an operation of forwarding the downlink data is triggered. That is, on one hand, the downlink data is sent to the UE through the air interfaces of the original base station; on the other hand, the downlink data is transmitted to the target base station through an interface between the original base station and the target base station. In this way, it may be ensured that the original base station does not stop transmission of downlink data in the handover process, and a discontinuation of the transmission of the downlink data is avoided in the handover process, and thus a handover performance may be enhanced. In this embodiment, the original base station may transmit the downlink data packet to the target base station after the original base station acquires a forwarding address. That is, transmitting the downlink data packet to the target base station may be understood as the operation of forwarding the downlink data packet. That is, the operation of forwarding the downlink data packet is triggered when transmitting the downlink data packet to the UE by the original base station. The forwarding address may include address information needed when transmitting the data, such as an IP address of the target base station, and a port address of the target base station. Information included is not specifically limited herein.

Optionally, in the above embodiment, the above method may also include a step of transmitting a value of a current Hyper Frame Number (HFN) of the downlink data packet to the target base station by the original base station.

In this embodiment, when transmitting the downlink data packet to the target base station, the value of the current HFN of the downlink data packet may be transmitted to the target base station, so that the target base station may know the value of the current HFN of the downlink data packet and thereby manage the downlink data of the UE in a better way. Additionally, in this embodiment, only a value of a HFN of a first downlink data packet may be transmitted to the target base station, wherein the first downlink data packet is a first downlink data packet transmitted from the original base station to the target base station, to reduce transmission overhead. Of course, in some scenarios, values of HFNs of a plurality of downlink data packets may also be transmitted by the original base station.

Optionally, in this embodiment, the value of HFN of the downlink data packet transmitted from the original base station to the target base station may be used by the target base station to determine, according to the value of the HFN and the downlink data packet transmitted by the original base station, values of HFNs of downlink data packets to be transmitted to the UE subsequently.

In this embodiment, by transmitting the value of the HFN of the downlink data packet from the original base station to the target base station, the target base station may determine, according to the value of the HFN and the downlink data packet transmitted by the original base station, values of HFNs of downlink data packets to be transmitted to the UE subsequently. Thus, it may be prevented that the target base station transmits downlink data packets having been transmitted to the UE by the original base station, and thus wasting network transmission resources may be avoided.

Optionally, the data described above may include a uplink data packet. The maintaining the transmission of the data of the UE by the original base station may include transmitting the uplink data packet to a gateway device by the original base station. Transmitting the data to the target base station by the original base station when maintaining the transmission of the data of the UE may include transmitting the uplink data packet to the target base station by the original base station when transmitting the uplink data packet to the gateway device.

In this embodiment, in the handover process, the original base station transmits the uplink data packet to the target base station when the original base station transmits the uplink data packets to the gateway device. Transmitting uplink data packet to the gateway device may include simultaneous transmission. For example, on one hand, the original base station continues the air-interface transmission of uplink data through the air-interfaces of the original base station; and on the other hand, an operation of forwarding the uplink data is triggered. That is, on one hand, the uplink data packet is sent to the gateway device, on the other hand, the same uplink data packet is transmitted to the target base station through the interface between the original base station and the target base station. In this way, it may be ensured that the original base station does not stop transmission of uplink data in the handover process, and the discontinuation of the transmission of the uplink data is avoided in the handover process, and thus the handover performance may be enhanced. In this embodiment, the original base station may transmit the uplink data packet to the target base station after the original base station acquires the forwarding address. That is, transmitting the uplink data packet to the target base station may be understood as an operation of forwarding the uplink data packet. That is, the operation of forwarding the uplink data packet is triggered when transmitting the uplink data packets to the gateway device by the original base station. The forwarding address may include address information needed when transmitting the data, such as the IP address of the target base station, and the port address of the target base station. The address information included is not specifically limited herein.

Optionally, in the above embodiment, the above method may also include a step of transmitting a value of a current Hyper Frame Number (HFN) of the uplink data packet to the target base station by the original base station.

In this embodiment, when transmitting the uplink data packet to the target base station, the value of the current HFN of the uplink data packet may be transmitted to the target base station, so that the target base station may know the value of the current HFN of the uplink data packet and thereby manage the uplink data of the UE in a better way. Additionally, in this embodiment, only a value of a HFN of a first downlink data packet may be transmitted to the target base station, wherein the first uplink data packet is a first uplink data packet transmitted from the original base station to the target base station, to reduce transmission overhead. Of course, in some scenarios, values of HFNs of a plurality of uplink data packets may also be transmitted by the original base station.

Optionally, in this embodiment, the value of HFN of the uplink data packet transmitted from the original base station to the target base station may be used by the target base station to determine, according to the value of the HFN and the uplink data packet transmitted by the original base station, values of HFNs of uplink data packets to be transmitted from the UE subsequently.

In this embodiment, by transmitting the value of the HFN of the uplink data packet from the original base station to the target base station, the target base station may determine, according to the value of the HFN and the uplink data packet transmitted by the original base station, values of HFNs of uplink data packets to be transmitted from the UE subsequently.

Optionally, the uplink data packet transmitted from the original base station to the target base station may be used by the target base station to generate a Packet Data Convergence Protocol (PDCP) status report according to the uplink data packet received by the target base station when a connection between the target base station and the UE is established successfully, and the target base station may send the PDCP status report to the UE.

In this embodiment, according to the uplink data packet transmitted from the original base station to the target base station, the target base station may generate the PDCP status report when the connection between the target base station and the UE is established successfully, and the target base station may send the PDCP status report to the UE. In this way, repeated transmission through the air-interfaces may be avoided.

Optionally, the method may further include a step of generating, by the original base station, a Serial Number (SN) status report of the downlink data packet of the UE when the original base station stops transmission of downlink data packets of the UE, and sending the SN status report to the target base station, wherein the SN status report includes information about a PDCP SN to be assigned to a downlink data packet of the UE by the target base station.

In this embodiment, the stopping transmission of downlink data packets of the UE by the original base station may be understood as determining to stop transmission of downlink data packets of the UE by the original base station. For example, the original base station may determine to stop transmission of downlink data packets of the UE when the connection between the UE and the target base station is established successfully or after the connection between the UE and the target base station is established successfully. In this embodiment, the information about the PDCP SNs of downlink data packets to be assigned to the UE by the target base station may be sent to the target base station through the SN status report. In this way, after the target base station receives the SN status report, the target base station may determine the information about the PDCP SNs of the downlink data packets to be assigned to the UE.

Optionally, the method may also include a step of generating, by the original base station, a SN status report of the uplink data packet of the UE when the original base station stops transmission of uplink data packets of the UE, and sending the SN status report to the target base station, wherein the SN status report includes a receiving state of the uplink data packet of the UE and an expected value of a HFN of a uplink data packet from the UE.

In this embodiment, the stopping transmission of uplink data packets of the UE by the original base station may be understood as determining to stop transmission of uplink data packets of the UE by the original base station. For example, the original base station may determine to stop transmission of uplink data packets of the UE when the connection between the UE and the target base station is established successfully or after the connection between the UE and the target base station is established successfully. In this embodiment, the receiving state of the uplink data packet of the UE and an expected value of a HFN of a uplink data packet from the UE may be sent to the target base station through the SN status report. In this way, when the target base station receives the SN status report, the target base station may determine the receiving state of the uplink data packet of the UE and the expected value of the HFN of a uplink data packet from the UE, thereby achieving effective transmission of uplink data packets of the UE.

Optionally, in this embodiment, the above method further includes a step of stopping sending the uplink data packet of the UE to the gateway device by the original base station when the original base station stops transmission of uplink data packets of the UE by the original base station.

In this embodiment, the original base station may stop sending the uplink data packet of the UE to the gateway device so as to save network transmission resources.

In this embodiment, in the handover process in which the UE hands over from the original bases station to the target base station, the original base station maintains the transmission of the data of the UE; and when maintaining the transmission of the data of the UE, the original base station transmits the data to the target base station. In this way, when the UE hands over from the original base station to the target base station, the original base station maintains the transmission of the data of the UE and transmits the data to the target base station. Therefore, the discontinuation period of the transmission of the data of the UE may be shortened, the handover performance may be enhanced, and the development requirement of the network may be satisfied.

Referring to FIG. 4, FIG. 4 is a flowchart of another example of a data transmission method provided in some embodiments of the present disclosure. As shown in FIG. 4, the example of the data transmission method includes a step 401.

Step 401: maintaining transmission of data of a UE between the UE and an original base station by the UE in a handover process in which the UE hands over from the original base station to a target base station, wherein when the UE maintains the transmission of the data of the UE between the original base station and the UE, the original base station also transmits the data of the UE to the target base station.

Optionally, the data includes a downlink data packet. The maintaining transmission of data of the UE between the UE and the original base station by the UE includes: receiving, by the UE, the downlink data packet transmitted from the original base station, wherein when the UE receives the downlink data packet transmitted from the original base station, the original base station may transmit the downlink data packet to the target base station.

Optionally, the data includes a uplink data packet. The maintaining transmission of data of the UE between the UE and the original base station by the UE includes: transmitting the uplink data packet to the original base station by the UE, wherein when the UE transmits the uplink data packet to the original base station, the original base station may transmit the uplink data packet to the target base station.

Optionally, the method further includes: receiving, by the UE, a PDCP status report transmitted from the target base station, wherein the PDCP status report is generated by the target base station according to the received uplink data packet when the connection between the UE and the target base station is established successfully.

Optionally, values of HFNs of subsequent downlink data packets transmitted from the target base station and received by the UE are determined by the target base station according to the value of the HFN of the downlink data packet transmitted by the original base station and the downlink data packet transmitted by the original base station.

Optionally, values of HFNs of subsequent uplink data packets transmitted from the UE to the target base station are determined by the target base station according to the value of the HFN of the uplink data packet transmitted by the original base station and the uplink data packet transmitted by the original base station.

Optionally, after the original base station stops transmission of downlink data packets of the UE, the information about a PDCP SN of the downlink data packet is included in the SN status report transmitted by the original base station and received by the target base station, and is information about a PDCP SN to be assigned to a downlink data packet of the UE by the target base station.

Optionally, after the original base station stops transmission of uplink data packets of the UE, a value of a HFN of the uplink data packet of the UE is included in the SN status report sent by the original base station and received by the target base station, and is the expected value of the HFN of the uplink data packet of the UE, and the SN status report also includes a receiving state of a uplink data packet of the UE.

Optionally, the method further includes: sending, by the UE to the target base station, a value of a SN and/or a value of a HFN of a first downlink PDCP PDU (protocol data unit) not received by the UE, wherein, the first downlink PDCP PDU not received by the UE refers to a first PDU of the UE not properly received by the UE from the original base station.

In this embodiment, the value of the SN and/or the value of the HFN of the PDU of the UE not properly received by the UE from the original base station may be sent to the target base station by the UE. In this way, when the target base station receives the value of the SN and/or the value of the HFN of the PDU, the PDU may be sent to the UE so as to avoid the PDU from being dropped.

Optionally, in this embodiment, the sending, by the UE to the target base station, the value of the SN and/or the value of the HFN of the current first downlink PDCP PDU not received by the UE, includes: sending, by the UE to the target base station through the downlink PDCP status report, the value of the SN and/or the value of the HFN of the current first downlink PDCP PDU not received by the UE.

In this embodiment, the value of the SN and/or the value of the HFN of the current first downlink PDCP PDU not received by the UE may be sent to the target base station through the downlink PDCP status report. In this way, the target base station may know the first downlink PDCP PDU not received by the UE more detailedly.

Optionally, the method may further includes: sending, by the UE to the target base station, a value of a SN and/or a value of a HFN of a first uplink PDCP PDU not being acknowledged. The first uplink PDCP PDU not being acknowledged refers to the first uplink PDU of the UE not being acknowledged by the original base station.

In this embodiment, the value of the SN and/or the value of the HFN of the first uplink PDU of the UE not being acknowledged by the original base station may be sent to the target base station by the UE. In this way, when the target base station receives the value of the SN and/or the value of the HFN of the PDU, the target base station may determine whether the PDU is received. If the PDU is not received, the target base station may inform the UE to resend the PDU, so as to avoid the uplink PDU from being dropped.

Optionally, in this embodiment, the sending, by the UE to the target base station, the value of the SN and/or the value of the HFN of the first uplink PDCP PDU not being acknowledged may include: sending, by the UE to the target base station through the downlink PDCP status report, the value of the SN and/or the value of the HFN of the first uplink PDCP PDU not being acknowledged.

In this embodiment, the value of the SN and/or the value of the HFN of the first uplink PDCP PDU not being acknowledged may be sent to the target base station through the downlink PDCP status report. In this way, the target base station may know more detailedly the first uplink PDCP PDU not being acknowledged.

It is noted that, this embodiment is an embodiment at a UE side corresponding to the embodiment shown in FIG. 3. Detailed implementation of this embodiment may be obtained by referring to the embodiment shown in FIG. 3 which is not repeated in this embodiment so as to avoid repeated description thereof. In this embodiment, the discontinuation period of the transmission of the data of the UE may be shortened, and the handover performance may be enhanced so as to satisfy the development requirement of the network.

Referring to FIG. 5, FIG. 5 is a flowchart of another example of a data transmission method provided in some embodiments of the present disclosure. As shown in FIG. 5, the example of the data transmission method includes a step 501.

Step 501: receiving, by a target base station, data of a UE transmitted from an original base station in a handover process in which the UE hands over from the original base station to the target base station, wherein, the original base station maintains transmission of the data of the UE when the target base station receives the data of the UE transmitted by the original base station.

Optionally, the data includes a downlink data packet. The receiving, by the target base station, the data of the UE transmitted from the original base station, includes: receiving, by the target base station, the downlink data packet transmitted from the original base station, wherein when the target base station receives the downlink data packet transmitted from the original base station, the original base station may transmit the downlink data packet to the UE.

Optionally, the method further includes: receiving, by the target base station, a value of a current HFN of the downlink data packet transmitted from the original base station.

Optionally, the data includes a uplink data packet. The receiving, by the target base station, the data of the UE transmitted from the original base station, includes: receiving, by the target base station, the uplink data packet transmitted from the original base station, wherein when the target base station receives the uplink data packet transmitted from the original base station, the original base station may transmit the uplink data packet to a gateway device.

Optionally, the method further includes: receiving, by the target base station, a value of a current HFN of the uplink data packet transmitted from the original base station.

Optionally, the method further includes: generating, by the target base station, a PDCP status report according to the received uplink data packet when a connection between the UE and the target base station is established successfully, and sending the PDCP status report to the UE.

Optionally, the method further includes: determining, by the target base station according to the value of the HFN of the downlink data packet transmitted from the original base station and the downlink data packet transmitted from the original base station, a value of a HFN of a downlink data packet to be transmitted to the UE subsequently.

Optionally, the method further includes: determining, by the target base station according to the value of the HFN of the uplink data packet transmitted from the original base station and the uplink data packet transmitted from the original base station, a value of a HFN of a uplink data packet transmitted from the UE subsequently.

Optionally, the method further includes: receiving, by the target base station, a SN status report sent from the original base station when the original base station stops transmission of downlink data packets of the UE, wherein the SN status report is a SN status report of the downlink data packets of the UE generated by the original base station, and includes information about a PDCP SN of a downlink data packet of the UE to be assigned by the target base station.

Optionally, the method further includes: receiving, by the target base station, a SN status report transmitted from the original base station when the original base station stops transmission of uplink data packets of the UE, wherein the SN status report is a SN status report of uplink data packets of the UE generated by the original base station, and includes a receiving state of the uplink data packet of the UE and an expected value of a HFN of an uplink data packet from the UE.

Optionally, the method further includes: receiving, by the target base station from the UE, a value of a SN and/or a value of a HFN of a first downlink PDCP Protocol Data Unit (PDU) not being received by the UE, wherein the first downlink PDCP PDU is a first PDU not being received after a connection between the UE and the target base station is established successfully.

Optionally, the receiving, by the target base station from the UE, the value of the SN and/or the value of the HFN of the current first downlink PDCP PDU not received by the UE includes: receiving, by the target base station from a downlink PDCP status report transmitted from the UE, the value of the SN and/or the value of the HFN of the current first downlink PDCP PDU not received by the UE.

Optionally, the method further includes: receiving, by the target base station from the UE, a value of a SN and/or a value of a HFN of a first uplink PDCP PDU not being acknowledged, wherein the first uplink PDCP PDU not being acknowledged refers to a first PDU of the UE not being acknowledged by the original base station.

Optionally, the receiving, by the target base station from the UE, the value of the SN and/or the value of the HFN of the first uplink PDCP PDU not being acknowledged includes: receiving, by the target base station from the downlink PDCP status report transmitted by the UE, the value of the SN and/or the value of the HFN of the first uplink PDCP PDU not being acknowledged.

It is noted that, this embodiment is an embodiment at a base station side corresponding to the embodiments shown in FIG. 3 and FIG. 4. Detailed implementation of this embodiment may be obtained by referring to the embodiments shown in FIG. 3 and FIG. 4, which are not repeated in this embodiment so as to avoid repeated description thereof. In this embodiment, the discontinuation period of the transmission of the data of the UE may be shortened, and the handover performance may be enhanced so as to satisfy the development requirement of the network.

The data transmission method provided in some embodiments of the present disclosure is illustrated hereinafter by means of multiple examples.

Example 1

601. initiating a measurement procedure to the UE by the original base station.

When initiating the measurement procedure, transmissions of uplink data and downlink data may be performed among the UE, the original base station and the Core Network (CN), wherein the CN herein may include a MME or a gateway device.

602. performing a handover determination procedure by the original base station.

603. sending a handover request to the target base station by the original base station.

604. receiving, by the original base station, a handover response sent from the target base station.

The handover response may carry a forwarding address.

605. sending a handover command to the UE by the original base station.

606. forwarding data to the target base station by the original base station.

In this step, the original base station may forward the data of the UE to the target base station. Additionally, the step may be understood as triggering forwarding of the data by the original base station, wherein forwarded uplink data includes data packets of the UE having been received by the original base station, and forwarded downlink data includes data packets having been sent to the UE.

607. sending a HFN information notification to the target base station by the original base station.

The HFN information notification may be a value of a current HFN of the data sent in step 606. Additionally, the HFN information notification may include a value of a HFN and a value of a SN of a first uplink data packet being forwarded, and a value of a HFN and a value of a SN of a first downlink data packet being forwarded.

608. performing transmissions of uplink data and downlink data by the original base station.

The uplink data (i.e., data packets of the UE having been received) is directly sent to the CN. Additionally, steps 606, 607 and 608 may be performed simultaneously.

609. establishing the connection between the UE and the target base station, or initiating a synchronization procedure between the UE and the target base station.

6010. moving away from an old cell by the UE, i.e., stopping communicating with the original base station by the UE.

Steps 609 and 6010 may be performed simultaneously.

6011. sending a handover completion message to the target base station by the UE.

6012. sending a PDCP status report of downlink data by the UE, and generating and sending a PDCP status report of uplink data by the target base station according to forwarded uplink data received by the target base station, and then transmitting uplink data and/or downlink data between the UE and the target base station, wherein the downlink data may be data packets forwarded from the original base station, and the uplink data may be selectively sent to the CN by the target base station according to the data packets forwarded from the original base station, i.e., the data packets forwarded from the original base station are excluded so as to avoid data sent to the CN by the target base station is the same as the data sent to the CN by the original base station.

6013. performing a path handover procedure between the target base station and the CN.

When performing the path handover procedure, the CN may switch a downlink path and send an end mark to the original base station. The CN may also perform the transmissions of the uplink data and the downlink data between the CN and the target base station, and the original base station may send an end mark to the target base station. The end mark sent by the original base station is used to notify the target base station that data forwarding is stopped and the transmissions of the uplink data and the downlink data performed by the original base station are stopped.

6014. sending a context release message to the original base station by the target base station.

6015. releasing resources by the original base station.

Example 2

701. initiating a measurement procedure to a master base station by the UE.

702. sending, by the master base station to a target SeNB, a request for adding a secondary base station.

703. feeding, to the master base station by the target SeNB, a response for adding the secondary base station.

704. sending, to an original SeNB by the master base station, a command for releasing a secondary base station.

The response for adding a secondary base station and the command for releasing a secondary base station may carry a forwarding address.

705. sending a handover command to the UE by the master base station.

706. initiating a data forwarding procedure to the target SeNB by the original SeNB.

Step 706 may be understood as triggering the data forwarding procedure by the original SeNB, and forwarded uplink data includes data packets of the UE having been received by the original SeNB, and forwarded downlink data includes data packets having been sent to the UE.

707. sending HFN information to the target SeNB by the original SeNB through the master base station.

The HFN information may a value of a HFN and a value of a SN of a first uplink data packet forwarded, and a value of a HFN and a value of a SN of a first downlink data packet forwarded.

708. performing transmissions of uplink data and downlink data through the original SeNB.

In this Step, the uplink data and the downlink data are transmitted through the original SeNB, the uplink data (i.e., data packets of the UE having been received) is directly sent to the CN.

Additionally, steps 706, 707 and 708 may be performed simultaneously.

709. sending a handover completion message to the master base station by the UE.

7010. sending a configuration completion message to the original SeNB by the master base station.

7011. initiating a synchronization procedure to the target SeNB by the UE or starting a connection establishment procedure. At the same time, the UE stops communication with the original SeNB.

In the synchronization procedure, the CN may also transmit downlink data to the original SeNB, and the original SeNB may also forward the downlink data to the target SeNB.

The step 709 and the step 7011 are not sequential in time.

7012. sending a PDCP status report of downlink data by the UE, and generating and sending a PDCP status report of uplink data by the target SeNB according to forwarded uplink data received by the target SeNB, and then transmitting uplink data and/or downlink data between the UE and the target SeNB, wherein the downlink data may be data packets forwarded from the original SeNB, and the uplink data may be selectively sent to the CN by the target SeNB according to the data packets forwarded from the original SeNB, i.e., the data packets having been forwarded are excluded so as to avoid data sent to the CN by the target SeNB is the same as the data sent to the CN by the original SeNB.

7013. performing a path handover procedure between the master base station and the CN.

7014. sending an end mark to the CN and sending an end mark to the target SeNB by the master base station. The end marks sent by the master base station are used to notify the target eNB that data forwarding is stopped and the transmissions of the uplink data and the downlink data performed by the original eNB are stopped.

7015. performing transmissions of uplink data and downlink data by the UE through the target SeNB.

7016. sending a path handover completion message to the master base station by the CN.

7017. sending a context release message to an original SeNB by the master base station.

Example 3

801. initiating a measurement procedure to the master base station by the UE.

802. sending, by the master base station to the target SeNB, a request for adding a secondary base station to a target SeNB.

803. feeding, by the target SeNB to the master base station, a response for adding the secondary base station.

804. sending, by the master base station to the original SeNB, a command for releasing a secondary base station.

The response for adding a secondary base station and the command for releasing a secondary base station may carry a forwarding address.

805. sending a handover command to the UE by the master base station.

806. Bi-casting downlink data by the master base station.

In this step, the master base station transmits data to the original SeNB and the target SeNB.

807. transmitting uplink data and/or downlink data between the original SeNB and the UE.

In this step, the HFN information may include a value of a HFN and a value of a SN of a first uplink data packet forwarded, and a value of a HFN and a value of a SN of a first downlink data packet forwarded.

808. transmitting uplink data to the master base station by the original SeNB.

809. transmitting uplink data and/or downlink data between the master base station and the CN.

Additionally, steps 806, 807, 808 and 809 may be performed simultaneously.

8010. sending a handover completion message to the master base statin by the UE.

8011. sending a secondary-base-station configuration completion message to the target SeNB by the master base station.

8012. initiating a synchronization procedure to the target SeNB by the UE or starting a connection establishment procedure.

At the same time, the UE stops communication with the original SeNB. Additionally, the step 8010 and the step 8012 may not be sequential in time.

8013. sending a PDCP status report of downlink data to the target SeNB by the UE, wherein the target SeNB is capable of analyzing each PDCP PDU during the handover procedure, and when the target SeNB finds the PDCP status report, the target SeNB may transmit downlink data selectively according to the PDCP status report, i.e. data packets having been acknowledged in the PDCP status report are excluded, and then the UE transmits uplink data and/or downlink data with the target SeNB normally.

8014. transmitting uplink data and/or downlink data between the master base station and the target SeNB.

8015. transmitting uplink data and/or downlink data between the master base station and the CN.

8016. sending a context release message to the original SeNB by the master base station.

Figure 9:
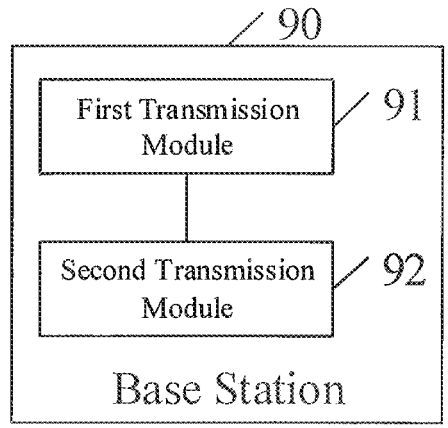
FIG. 9 is a structural schematic diagram of an example of a base station provided in some embodiments of the present disclosure.

Referring to FIG. 9, FIG. 9 is a structural schematic diagram of an example of a base station provided in some embodiments of the present disclosure. The base station 90 is an original base station. As shown in FIG. 9, the base station 90 includes a first transmission module 91 and a second transmission module 92.

The first transmission module 91 is configured to maintain transmission of data of a UE in a handover process in which the UE hands over from the original base station to a target base station The second transmission module 92 is configured to transmit the data to the target base station when maintaining transmission of data of the UE.

Optionally, the data may include a downlink data packet. The first transmission module 91 may be configured to transmit the downlink data packet to the UE. The second transmission module 92 may be configured to transmit the downlink data packet to the target base station when transmitting the downlink data packet to the UE.

Figure 10:
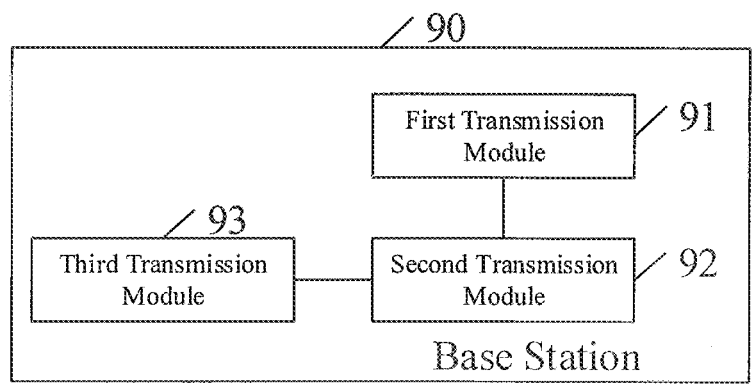
FIG. 10 is a structural schematic diagram of another example of a base station provided in some embodiments of the present disclosure.

Optionally, as shown in FIG. 10, the base station 90 may also include a third transmission module 93. The third transmission module 93 is configured to transmit a value of a current Hyper Frame Number (HFN) of the downlink data packet to the target base station.

Optionally, the data may include a uplink data packet. The first transmission module 91 may be configured to transmit the uplink data packet to the target base station when transmitting the uplink data packet to a gateway device.

Figure 11:
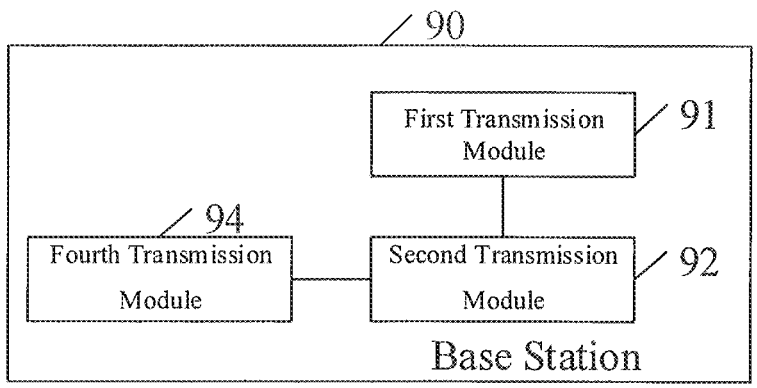
FIG. 11 is a structural schematic diagram of another example of a base station provided in some embodiments of the present disclosure.

Optionally, as shown in FIG. 11, the base station 90 may also include a fourth transmission module 94. The fourth transmission module 94 is configured to transmit a value of a current Hyper Frame Number (HFN) of the uplink data packet to the target base station.

Optionally, the uplink data packet transmitted from the original base station to the target base station may be used by the target base station to generate a Packet Data Convergence Protocol (PDCP) status report according to the uplink data packet received by the target base station when a connection between the target base station and the UE is established successfully, and the target base station may send the PDCP status report to the UE.

Optionally, the value of HFN of the downlink data packet transmitted from the original base station to the target base station may be used by the target base station to determine, according to the value of the HFN and the downlink data packet transmitted by the original base station, values of HFNs of downlink data packets to be transmitted to the UE subsequently.

Optionally, the value of the HFN of the uplink data packet transmitted from the original base station to the target base station may be used by the target base station to determine, according to the value of the HFN and the uplink data packet transmitted by the original base station, values of HFNs of uplink data packets to be transmitted from the UE subsequently.

Figure 12:
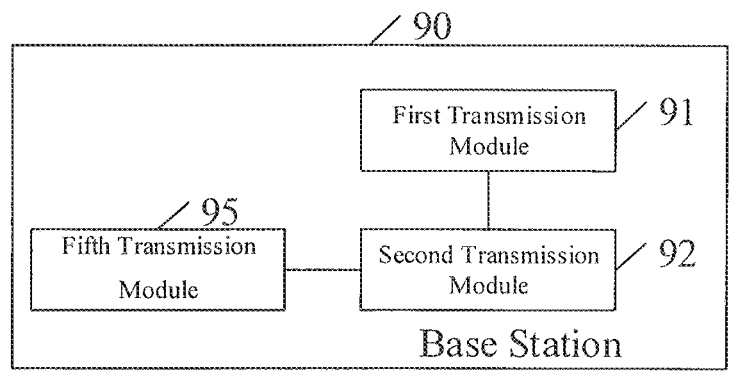
FIG. 12 is a structural schematic diagram of another example of a base station provided in some embodiments of the present disclosure.

Optionally, as shown in FIG. 12, the base station 90 further includes a fifth transmission module 95. The fifth transmission module 95 is configured to generate a Serial Number (SN) status report of the downlink data packet of the UE when the original base station stops transmission of downlink data packets of the UE, and send the SN status report to the target base station, wherein the SN status report includes information about a PDCP SN to be assigned to a downlink data packet of the UE by the target base station.

Figure 13:
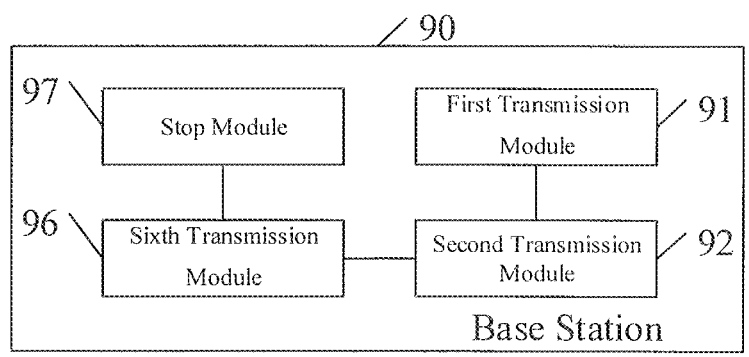
FIG. 13 is a structural schematic diagram of another example of a base station provided in some embodiments of the present disclosure.

Optionally, as shown in FIG. 13, the base station 90 further includes a sixth transmission module 96. The sixth transmission module 96 is configured to generate a SN status report of the uplink data packet of the UE when the original base station stops transmission of uplink data packets of the UE, and send the SN status report to the target base station, wherein the SN status report includes a receiving state of the uplink data packet of the UE and an expected value of a HFN of a uplink data packet from the UE.

Optionally, in this embodiment, the base station 90 further includes a stop module 97. The stop module 97 is configured to stop sending the uplink data packet of the UE to the gateway device when the original base station stops transmission of uplink data packets of the UE.

It should be noted that, the base station 90 in the embodiment may be the original base station in the embodiments shown in FIG. 1 to FIG. 8. Operations of the original base station in the embodiments shown in FIG. 1 to FIG. 8 may be implemented by the base station 90 in the embodiment, and same technical effects may be achieved and repeated description is not provided herein.

Figure 14:
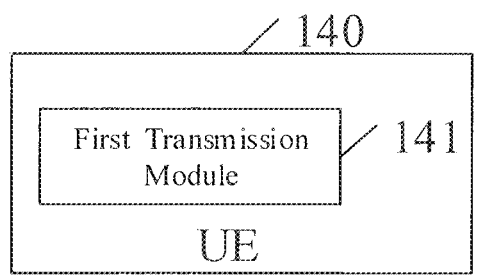
FIG. 14 is a structural schematic diagram of an example of a User Equipment (UE) provided in some embodiments of the present disclosure.

Referring to FIG. 14, FIG. 14 is a structural schematic diagram of an example of a UE provided in some embodiments of the present disclosure. As shown in FIG. 14, the UE 140 includes a first transmission module 141. The first transmission module 141 is configured to maintain transmission of data of a UE between the UE and an original base station in a handover process in which the UE hands over from the original base station to a target base station, wherein when the UE maintains the transmission of the data of the UE between the original base station and the UE, the original base station also transmits the data of the UE to the target base station.

Optionally, the data includes a downlink data packet. The first transmission module is configured to receive the downlink data packet transmitted from the original base station, wherein when the UE receives the downlink data packet transmitted from the original base station, the original base station may transmit the downlink data packet to the target base station.

Optionally, the data includes a uplink data packet. The first transmission module is configured to transmit the uplink data packet to the original base station, wherein when the UE transmits the uplink data packet to the original base station, the original base station may transmit the uplink data packet to the target base station.

Figure 15:
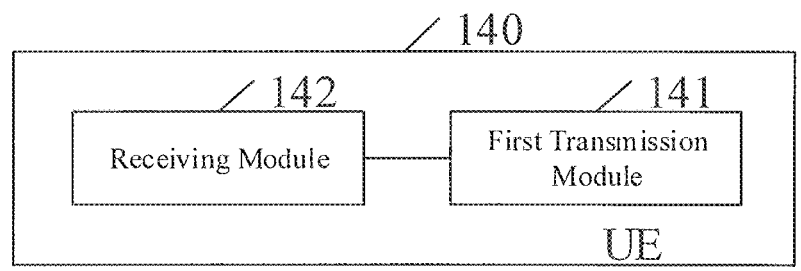
FIG. 15 is a structural schematic diagram of another example of a UE provided in some embodiments of the present disclosure.

Optionally, as shown in FIG. 15, the UE 140 further includes a receiving module 142. The receiving module 142 is configured to receive a PDCP status report transmitted from the target base station, wherein the PDCP status report is generated by the target base station according to the received uplink data packet when the connection between the UE and the target base stations is established successfully.

Optionally, values of HFNs of subsequent downlink data packets transmitted from the target base station and received by the UE are determined by the target base station according to the value of the HFN of the downlink data packet transmitted by the original base station and the downlink data packet transmitted by the original base station.

Optionally, values of HFNs of subsequent uplink data packets transmitted from the UE to the target base station are determined by the target base station according to the value of the HFN of the uplink data packet transmitted by the original base station and the uplink data packet transmitted by the original base station.

Optionally, after the original base station stops transmission of downlink data packets of the UE, information about a PDCP SN of the downlink data packet of the UE is included in the SN status report transmitted by the original base station and received by the target base station, and is information about a PDCP SN to be assigned to a downlink data packet of the UE by the target base station.

Optionally, after the original base station stops transmission of uplink data packets of the UE, a value of a HFN of the uplink data packet of the UE is included in the SN status report sent by the original base station and received by the target base station, and is an expected value of a HFN of the uplink data packet from the UE, and the SN status report also includes a receiving state of a uplink data packet of the UE.

Figure 16:
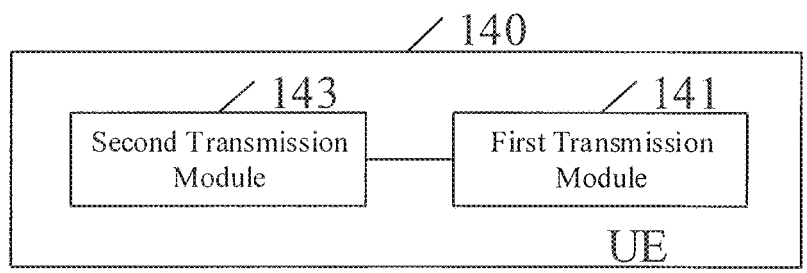
FIG. 16 is a structural schematic diagram of another example of a UE provided in some embodiments of the present disclosure.

Optionally, as shown in FIG. 16, the UE 140 further includes a second transmission module 143. The second transmission module 143 is configured to send, to the target base station, a value of a SN and/or a value of a HFN of a first downlink PDCP PDU not received by the UE, wherein, the first downlink PDCP PDU not received by the UE refers to a first PDU of the UE not properly received by the UE from the original base station.

Optionally, the second transmission module 143 may be configured to send, to the target base station through a downlink PDCP status report, the value of the SN and/or the value of the HFN of the current first downlink PDCP PDU not received by the UE.

Figure 17:
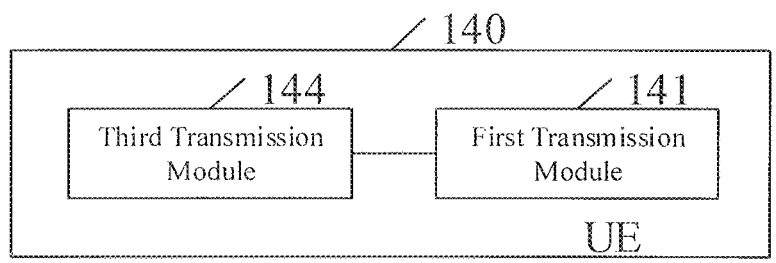
FIG. 17 is a structural schematic diagram of another example of a UE provided in some embodiments of the present disclosure.

Optionally, as shown in FIG. 17, the UE 140 further includes a third transmission module 144. The third transmission module 144 is configured to transmit, to the target base station, a value of a SN and/or a value of a HFN of a first uplink PDCP PDU not being acknowledged, wherein the first uplink PDCP PDU not being acknowledged is a first uplink PDU of the UE not being acknowledged by the original base station.

Optionally, the third transmission module 144 may be configured to send, to the target base station through the downlink PDCP status report, the value of the SN and/or the value of the HFN of the first uplink PDCP PDU not being acknowledged.

It should be noted that, the UE 140 in the embodiment may be the UE in the embodiments shown in FIG. 1 to FIG. 8. Operations of the UE in the embodiments shown in FIG. 1 to FIG. 8 may be implemented by the UE 140 in the embodiment, and same technical effects may be achieved and repeated description is not provided herein.

Figure 18:
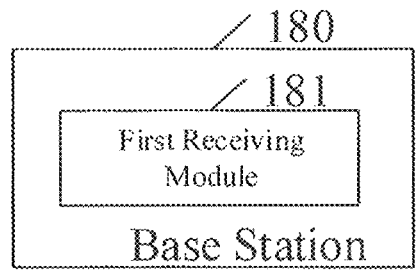
FIG. 18 is a structural schematic diagram of another example of a base station provided in some embodiments of the present disclosure.

Referring to FIG. 18, FIG. 18 is a structural schematic diagram of another example of a base station provided in some embodiments of the present disclosure. The base station 180 is a target base station. As shown in FIG. 18, the base station includes a first receiving module 181. The first receiving module 181 is configured to receive data of a UE transmitted from an original base station in a handover process in which the UE hands over from the original base station to the target base station, wherein, the original base station maintains transmission of the data of the UE when the target base station receives the data of the UE transmitted by the original base station.

Optionally, the data includes a downlink data packet. The first receiving module 181 may be configured to receive the downlink data packet transmitted from the original base station, wherein when the target base station receives the downlink data packet transmitted from the original base station, the original base station may transmit the downlink data packet to the UE.

Figure 19:
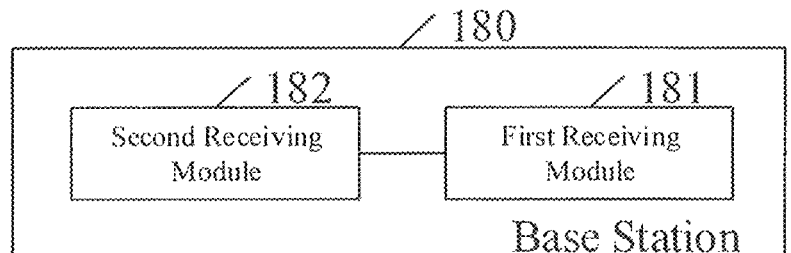
FIG. 19 is a structural schematic diagram of another example of a base station provided in some embodiments of the present disclosure.

Optionally, as shown in FIG. 19, the base station 180 may also include a second receiving module 182. The second receiving module 182 is configured to receive a value of a current HFN of the downlink data packet transmitted from the original base station.

Optionally, the data includes a uplink data packet. The first receiving module 181 is configured to receive the uplink data packet transmitted from the original base station, wherein when the target base station receives the uplink data packet transmitted from the original base station, the original base station may transmit the uplink data packet to a gateway device.

Figure 20:
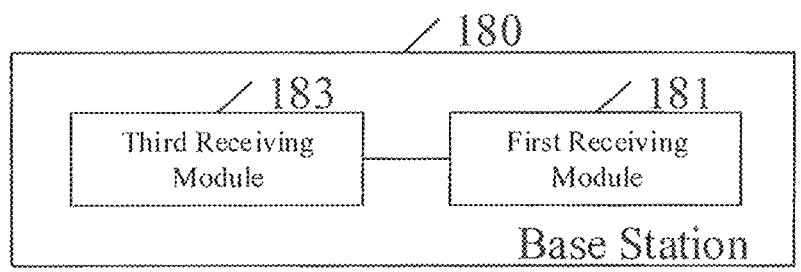
FIG. 20 is a structural schematic diagram of another example of a base station provided in some embodiments of the present disclosure.

Optionally, as shown in FIG. 20, the base station 180 may also include a third receiving module 183. The third receiving module 183 is configured to receive a value of a current HFN of the uplink data packet transmitted from the original base station.

Figure 21:
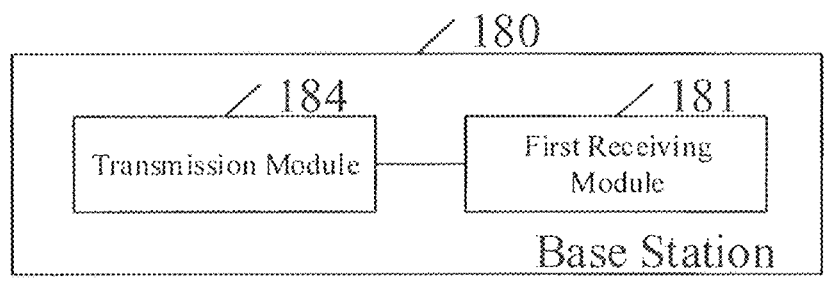
FIG. 21 is a structural schematic diagram of another example of a base station provided in some embodiments of the present disclosure.

Optionally, as shown in FIG. 21, the base station 180 further includes a transmission module 184. The transmission module 184 is configured to generate a PDCP status report according to the uplink data packet received by the target base station when a connection between the UE and the target base station is established successfully, and send the PDCP status report to the UE.

Figure 22:
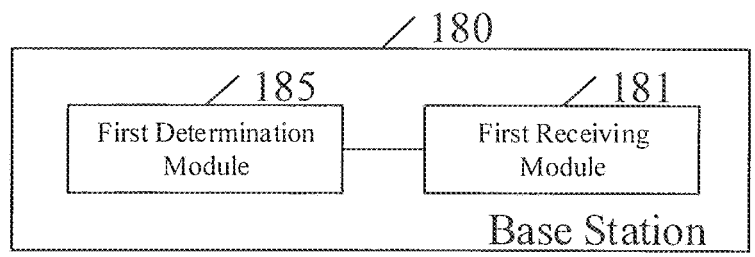
FIG. 22 is a structural schematic diagram of another example of a base station provided in some embodiments of the present disclosure.

Optionally, as shown in FIG. 22, the base station 180 further includes a first determination module 185. The first determination module 185 is configured to determine, according to the value of the HFN of the downlink data packet transmitted from the original base station and the downlink data packet transmitted from the original base station, a value of a HFN of a downlink data packet to be transmitted to the UE subsequently.

Figure 23:
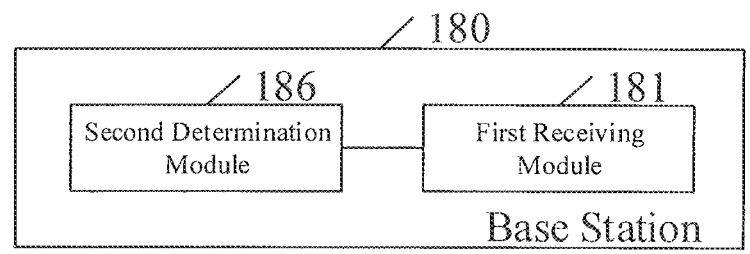
FIG. 23 is a structural schematic diagram of another example of a base station provided in some embodiments of the present disclosure.

Optionally, as shown in FIG. 23, the base station 180 further includes a second determination module 186. The second determination module 186 is configured to determine, according to the value of the HFN of the uplink data packet transmitted from the original base station and the uplink data packet transmitted from the original base station, a value of a HFN of a uplink data packet transmitted from the UE subsequently.

Figure 24:
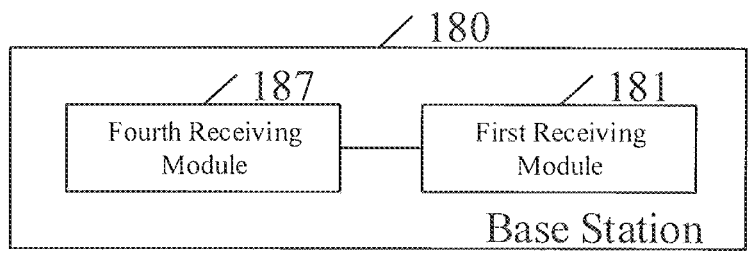
FIG. 24 is a structural schematic diagram of another example of a base station provided in some embodiments of the present disclosure.

Optionally, as shown in FIG. 24, the base station 180 further includes a fourth receiving module 187. The fourth receiving module 187 is configured to receive a SN status report sent from the original base station when the original base station stops transmission of downlink data packets of the UE, wherein the SN status report is a SN status report of the downlink data packet of the UE generated by the original base station, and includes information about a PDCP SN of a downlink data packet of the UE to be assigned by the target base station.

Figure 25:
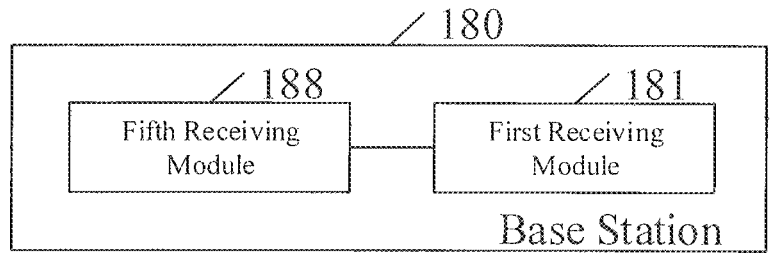
FIG. 25 is a structural schematic diagram of another example of a base station provided in some embodiments of the present disclosure.

Optionally, as shown in FIG. 25, the base station 180 further includes a fifth receiving module 188. The fifth receiving module 188 is configured to receive a SN status report transmitted from the original base station when the original base station stops transmission of uplink data packets of the UE, wherein the SN status report is a SN status report of the uplink data packet of the UE which is generated by the original base station, and includes a receiving state of the uplink data packet of the UE and an expected value of a HFN of a uplink data packet from the UE.

Figure 26:
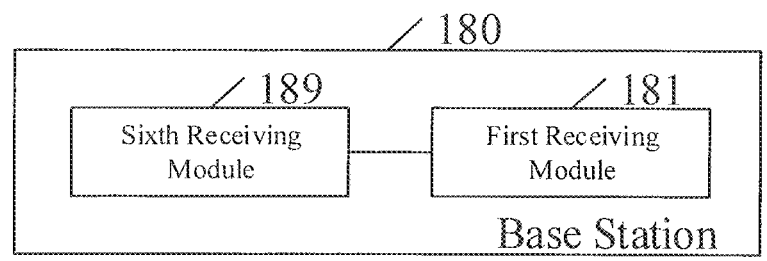
FIG. 26 is a structural schematic diagram of another example of a base station provided in some embodiments of the present disclosure.

Optionally, as shown in FIG. 26, the base station 180 further includes a sixth receiving module 189. The sixth receiving module 189 is configured to receive, from the UE, a value of a SN and/or a value of a HFN of a first downlink PDCP Protocol Data Unit (PDU) not being received by the UE, wherein the first downlink PDCP PDU not being received by the UE is a first PDU not being received after a connection between the UE and the target base station is established successfully.

Optionally, the sixth receiving module 189 may be configured to receive, from the downlink PDCP status report transmitted from the UE, the value of the SN and/or the value of the HFN of the current first downlink PDCP PDU not received by the UE.

Figure 27:
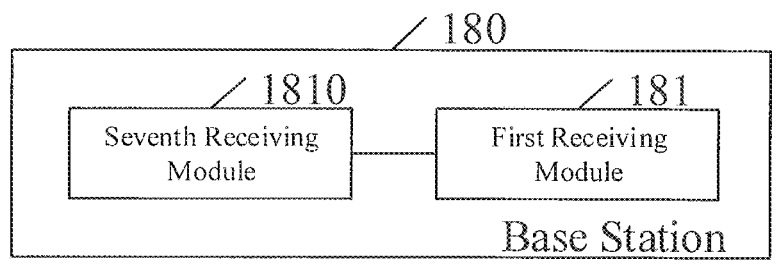
FIG. 27 is a structural schematic diagram of another example of a base station provided in some embodiments of the present disclosure.

Optionally, as shown in FIG. 27, the base station 180 further includes a seventh receiving module 1810. The seventh receiving module 1810 is configured to receive, from the UE, a value of a SN and/or a value of a HFN of a first uplink PDCP PDU not being acknowledged, wherein the first uplink PDCP PDU not being acknowledged refers to a first PDU of the UE not being acknowledged by the original base station.

Optionally, the seventh receiving module 1810 may be configured to receive, from the downlink PDCP status report transmitted by the UE, the value of the SN and/or the value of the HFN of the first uplink PDCP PDU not being acknowledged.

It should be noted that, the base station 180 in the embodiment may be the target base station in the embodiments shown in FIG. 1 to FIG. 8. Operations of the target base station in the embodiments shown in FIG. 1 to FIG. 8 may be implemented by the base station 180 in the embodiment, and same technical effects may be achieved and repeated description is not provided herein.

Figure 28:
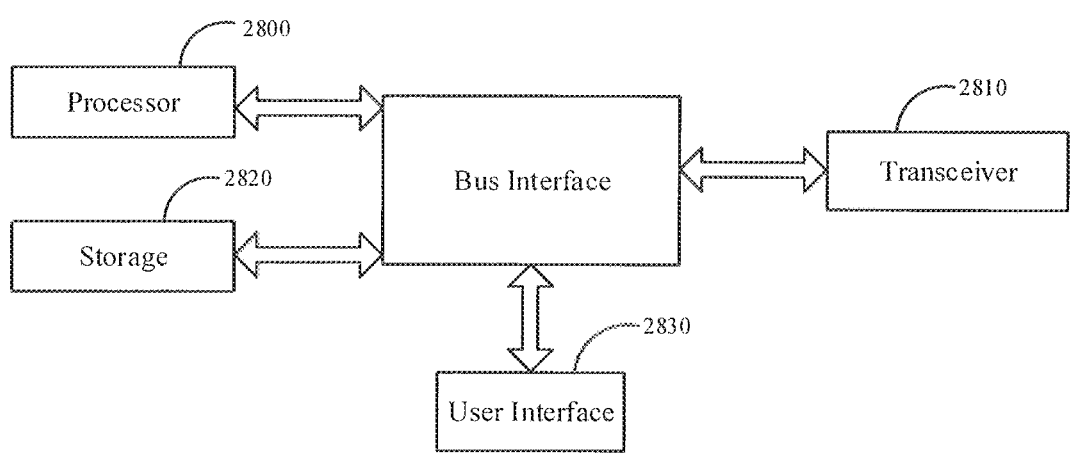
FIG. 28 is a structural schematic diagram of another example of a base station provided in some embodiments of the present disclosure.

Referring to FIG. 28, FIG. 28 shows a structure of a base station. The base station may be an original base station, and the base station includes a processor 2800, a transceiver 2810, a storage 2820, a user interface 2830 and a bus interface. The processor 2800 is configured to read programs in the storage 2820 to execute steps as follow: maintaining transmission of data of a UE through the transceiver 2810 in a handover process in which the UE hands over from the original base station to a target base station; and transmitting the data to the target base station through the transceiver 2810 when maintaining transmission of data of the UE.

The transceiver 2810 is configured to transmit data and receive data under a control of the processor 2800.

In FIG. 28, the bus interface may include any number of buses and bridges connected together. Specifically, a plurality of processors such as the processor 2800 and a plurality of storages such as the storage 2820 are connected together. The bus interface may also cause any other circuits such as a peripheral circuit, a voltage regulator and a power management circuit to be connected together. The circuits are known in the art, and thus detailed descriptions thereof are not further provided herein. The bus interface provides an interface. The transceiver 2810 may include a plurality of elements such as receivers, transmitters, and units for communicating with other devices through a transmission medium. Directed to different user equipments, the user interface 2830 may also be an interface capable of being connected to external devices including, but not limited to, keypads, displays, speakers, microphones, joysticks, or the like.

The processor 2800 takes charge of the bus interface and general processing. The storage 2820 may store data used by the processor 2800 when the processor 2800 performs operations.

Optionally, the data may include a downlink data packet Maintaining the transmission of the data of the UE may include transmitting the downlink data packet to the UE. Transmitting the data to the target base station when maintaining the transmission of the data of the UE may include transmitting the downlink data packet to the target base station when transmitting the downlink data packet to the UE.

Optionally, the processor 2800 is further configured to transmit a value of a current Hyper Frame Number (HFN) of the downlink data packet to the target base station through the transceiver 2810.

Optionally, the data may include a uplink data packet. The maintaining the transmission of the data of the UE may include transmitting the uplink data packet to a gateway device. Transmitting the data to the target base station when maintaining the transmission of the data of the UE may include transmitting the uplink data packet to the target base station when transmitting the uplink data packet to the gateway device.

Optionally, the processor 2800 is further configured to transmit a value of a current Hyper Frame Number (HFN) of the uplink data packet to the target base station through the transceiver 2810.

Optionally, the uplink data packet transmitted from the original base station to the target base station may be used by the target base station to generate a Packet Data Convergence Protocol (PDCP) status report according to the uplink data packet received by the target base station when a connection between the target base station and the UE is established successfully, and the target base station may send the PDCP status report to the UE.

Optionally, the value of HFN of the downlink data packet transmitted from the original base station to the target base station may be used by the target base station to determine, according to the value of the HFN and the downlink data packet transmitted by the original base station, values of HFNs of downlink data packets to be transmitted to the UE subsequently.

Optionally, the value of the HFN of the uplink data packet transmitted from the original base station to the target base station may be used by the target base station to determine, according to the value of the HFN and the uplink data packet transmitted by the original base station, values of HFNs of uplink data packets to be transmitted from the UE subsequently.

Optionally, the processor 2800 is further configured to generate a Serial Number (SN) status report of the downlink data packet of the UE when the original base station stops transmission of downlink data packets of the UE, and send the SN status report to the target base station through the transceiver 2810, wherein the SN status report includes information about a PDCP SN to be assigned to a downlink data packet of the UE by the target base station.

Optionally, the processor 2800 is further configured to generate a SN status report of the uplink data packet of the UE when the original base station stops transmission of uplink data packets of the UE, and send the SN status report to the target base station through the transceiver 2810, wherein the SN status report includes a receiving state of the uplink data packet of the UE and an expected value of a HFN of a uplink data packet from the UE.

Optionally, the processor 2800 is configured to stop sending the uplink data packet of the UE to the gateway device when the original base station stops transmission of uplink data packets of the UE.

It should be noted that, the base station in the embodiment may be the original base station in the embodiments shown in FIG. 1 to FIG. 8. Operations of the original base station in the embodiments shown in FIG. 1 to FIG. 8 may be implemented by the base station in the embodiment, and same technical effects may be achieved and repeated description is not provided herein.

Figure 29:
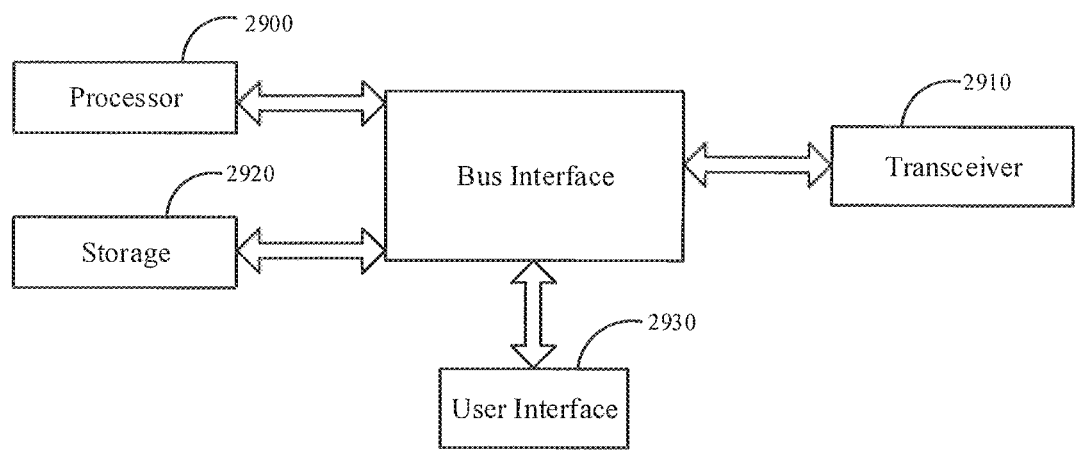
FIG. 29 is a structural schematic diagram of another example of a UE provided in some embodiments of the present disclosure.

Referring to FIG. 29, FIG. 29 shows a structure of a UE. The UE may include a processor 2900, a transceiver 2910, a storage 2920, a user interface 2930 and a bus interface. The processor 2900 is configured to read programs in the storage 2920 to execute steps as follow: maintaining transmission of data of a UE between the UE and an original base station through the transceiver 2910 in a handover process in which the UE hands over from the original base station to a target base station, wherein when the UE maintains the transmission of the data of the UE between the original base station and the UE, the original base station also transmits the data of the UE to the target base station.

The transceiver 2910 is configured to transmit data and receive data under a control of the processor 2900.

In FIG. 29, the bus interface may include any number of buses and bridges connected together. Specifically, a plurality of processors such as the processor 2900 and a plurality of storages such as the storage 2920 are connected together. The bus interface may also cause any other circuits such as a peripheral circuit, a voltage regulator and a power management circuit to be connected together. The circuits are known in the art, and thus detailed descriptions thereof are not further provided herein. The bus interface provides an interface. The transceiver 2910 may include a plurality of elements such as receivers, transmitters, and units for communicating with other devices through a transmission medium. Directed to different user equipments, the user interface 2930 may also be an interface capable of being connected to external devices including, but not limited to, keypads, displays, speakers, microphones, joysticks, or the like.

The processor 2900 takes charge of the bus interface and general processing. The storage 2920 may store data used by the processor 2900 when the processor 2800 performs operations.

Optionally, the data includes a downlink data packet. The maintaining transmission of data of a UE between the UE and the original base station includes receiving the downlink data packet transmitted from the original base station, wherein when the UE receives the downlink data packet transmitted from the original base station, the original base station may transmit the downlink data packet to the target base station.

Optionally, the data includes a uplink data packet. The maintaining transmission of data of a UE between the UE and the original base station includes transmitting the uplink data packet to the original base station, wherein when the UE transmits the uplink data packet to the original base station, the original base station may transmit the uplink data packet to the target base station.

Optionally, the processor 2900 is further configured to r receive, through the transceiver 2910, a PDCP status report transmitted from the target base station, wherein the PDCP status report is generated by the target base station according to the received uplink data packet when the connection between the UE and the target base station is established successfully.

Optionally, values of HFNs of subsequent downlink data packets transmitted from the target base station and received by the UE are determined by the target base station according to the value of the HFN of the downlink data packet transmitted by the original base station and the downlink data packet transmitted by the original base station.

Optionally, values of HFNs of subsequent uplink data packets transmitted from the UE to the target base station are determined by the target base station according to the value of the HFN of the uplink data packet transmitted by the original base station and the uplink data packet transmitted by the original base station.

Optionally, after the original base station stops transmission of downlink data packets of the UE, information about a PDCP SN of the downlink data packet of the UE is included in the SN status report transmitted by the original base station and received by the target base station, and is information about a PDCP SN to be assigned to a downlink data packet of the UE by the target base station.

Optionally, after the original base station stops transmission of uplink data packets of the UE, a value of a HFN of the uplink data packet of the UE is included in the SN status report sent by the original base station and received by the target base station, and is an expected value of a HFN of a uplink data packet from the UE, and the SN status report also includes a receiving state of the uplink data packet of the UE.

Optionally, the processor 2900 is further configured to send, to the target base station through the transceiver 2910, a value of a SN and/or a value of a HFN of a first downlink PDCP PDU not received by the UE, wherein, the first downlink PDCP PDU not received by the UE refers to a first PDU of the UE not properly received by the UE from the original base station.

Optionally, transmitting, to the target base station, the value of the SN and/or the value of the HFN of the current first downlink PDCP PDU not received by the UE, includes: transmitting, to the target base station through the downlink PDCP status report, the value of the SN and/or the value of the HFN of the current first downlink PDCP PDU not received by the UE.

Optionally, the processor 2900 is further configured to transmit, to the target base station through the transceiver 2910, a value of a SN and/or a value of a HFN of a first uplink PDCP PDU not being acknowledged, wherein the first uplink PDCP PDU not being acknowledged is a first uplink PDU of the UE not being acknowledged by the original base station.

Optionally, transmitting, to the target base station, the value of the SN and/or the value of the HFN of the first uplink PDCP PDU not being acknowledged includes: transmitting, to the target base station through the downlink PDCP status report, the value of the SN and/or the value of the HFN of the first uplink PDCP PDU not being acknowledged.

It should be noted that, the UE in the embodiment may be the UE in the embodiments shown in FIG. 1 to FIG. 8. Operations of the UE in the embodiments shown in FIG. 1 to FIG. 8 may be implemented by the UE in the embodiment, and same technical effects may be achieved and repeated description is not provided herein.

Figure 30:
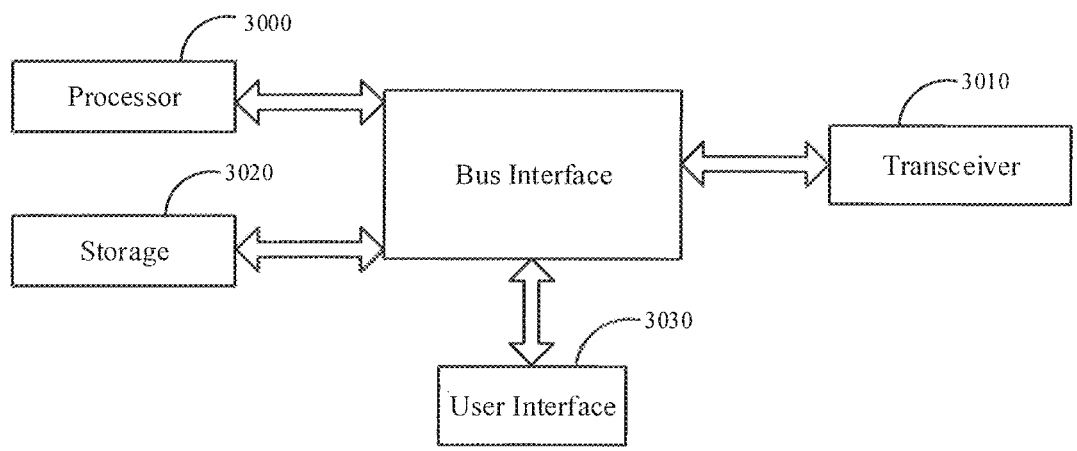
FIG. 30 is a structural schematic diagram of another example of a base station provided in some embodiments of the present disclosure.

Referring to FIG. 30, FIG. 30 shows a structure of a base station. The base station is a target base station. The base station may include a processor 3000, a transceiver 3010, a storage 3020, a user interface 3030 and a bus interface. The processor 3000 is configured to read programs in the storage 3020 to execute steps as follow: receiving, through the transceiver 3010, data of a UE transmitted from an original base station in a handover process in which the UE hands over from the original base station to the target base station, wherein, the original base station maintains transmission of the data of the UE when the target base station receives the data of the UE transmitted by the original base station.

The transceiver 3010 is configured to transmit data and receive data under a control of the processor 3000.

In FIG. 30, the bus interface may include any number of buses and bridges connected together. Specifically, a plurality of processors such as the processor 3000 and a plurality of storages such as the storage 3020 are connected together. The bus interface may also cause any other circuits such as a peripheral circuit, a voltage regulator and a power management circuit to be connected together. The circuits are known in the art, and thus detailed descriptions thereof are not further provided herein. The bus interface provides an interface. The transceiver 3010 may include a plurality of elements such as receivers, transmitters, and units for communicating with other devices through a transmission medium. Directed to different user equipments, the user interface 3030 may also be an interface capable of being connected to external devices including, but not limited to, keypads, displays, speakers, microphones, joysticks, or the like.

The processor 3000 takes charge of the bus interface and general processing. The storage 3020 may store data used by the processor 3000 when the processor 2800 performs operations.

Optionally, the data includes a downlink data packet. The receiving the data of the UE transmitted from the original base station, includes: receiving the downlink data packet transmitted from the original base station, wherein when the target base station receives the downlink data packet transmitted from the original base station, the original base station may transmit the downlink data packet to the UE.

Optionally, the processor 3000 is further configured to receive, through the transceiver 3010, a value of a current HFN of the downlink data packet transmitted from the original base station.

Optionally, the data includes a uplink data packet, the receiving the data of the UE transmitted from the original base station, includes: receiving the uplink data packet transmitted from the original base station, wherein when the target base station receives the uplink data packet transmitted from the original base station, the original base station may transmit the uplink data packet to a gateway device.

Optionally, the processor 3000 is further configured to receive, through the transceiver 3010, a value of a current HFN of the uplink data packet transmitted from the original base station.

Optionally, the processor 3000 is further configured to generate a PDCP status report according to the uplink data packet received by the target base station when a connection between the UE and the target base station is established successfully, and send the PDCP status report to the UE through the transceiver 3010.

Optionally, the processor 3000 is further configured to determine, according to the value of the HFN of the downlink data packet transmitted from the original base station and the downlink data packet transmitted from the original base station, a value of a HFN of a downlink data packet to be transmitted to the UE subsequently.

Optionally, the processor 3000 is further configured to determine, according to the value of the HFN of the uplink data packet transmitted from the original base station and the uplink data packet transmitted from the original base station, a value of a HFN of a uplink data packet transmitted from the UE subsequently.

Optionally, the processor 3000 is further configured to receive, through the transceiver 3010, a SN status report sent from the original base station when the original base station stops transmission of downlink data packets of the UE, wherein the SN status report is a SN status report of the downlink data packet of the UE generated by the original base station, and includes information about a PDCP SN of a downlink data packet of the UE to be assigned by the target base station.

Optionally, the processor 3000 is further configured to receive, through the transceiver 3010, a SN status report transmitted from the original base station when the original base station stops transmission of uplink data packets of the UE, wherein the SN status report is a SN status report of the uplink data packet of the UE generated by the original base station, and includes a receiving state of the uplink data packet of the UE and an expected value of a HFN of a uplink data packet from the UE.

Optionally, the processor 3000 is further configured to receive, through the transceiver 3010 and from the UE, a value of a SN and/or a value of a HFN of a first downlink PDCP Protocol Data Unit (PDU) not being received by the UE, wherein the first downlink PDCP PDU not being received by the UE is a first PDU not being received after the connection between the UE and the target base station is established successfully.

Optionally, receiving, from the UE, the value of the SN and/or the value of the HFN of the first downlink PDCP Protocol Data Unit (PDU) not received by the UE includes: receiving, from the downlink PDCP status report transmitted from the UE, the value of the SN and/or the value of the HFN of the current first downlink PDCP PDU not received by the UE.

Optionally, the processor 3000 is further configured to receive, through the transceiver 3010 and from the UE, the value of the SN and/or the value of the HFN of the first uplink PDCP PDU not being acknowledged, wherein the first uplink PDCP PDU not being acknowledged refers to the first PDU of the UE not being acknowledged by the original base station.

Optionally, the receiving, from the UE, the value of the SN and/or the value of the HFN of the first uplink PDCP PDU not being acknowledge, includes: receiving, from the downlink PDCP status report transmitted by the UE, the value of the SN and/or the value of the HFN of the first uplink PDCP PDU not being acknowledged.

It should be noted that, the base station in the embodiment may be the target base station in the embodiments shown in FIG. 1 to FIG. 8. Operations of the target base station in the embodiments shown in FIG. 1 to FIG. 8 may be implemented by the base station in the embodiment, and same technical effects may be achieved and repeated description is not provided herein.

Figure 31:
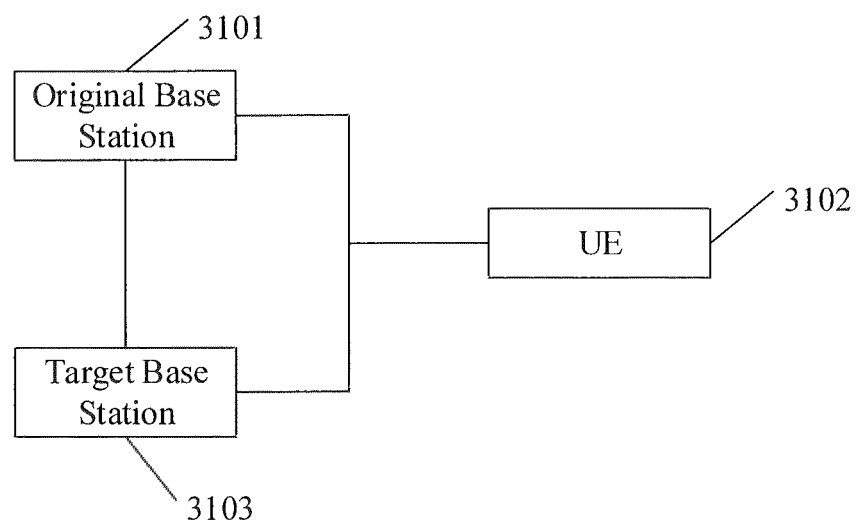
FIG. 31 is a structural schematic diagram of an example of a data transmission system provided in some embodiments of the present disclosure.

Referring to FIG. 31, FIG. 31 is a structural schematic diagram of an example of a data transmission system provided in some embodiments of the present disclosure. As shown in FIG. 31, an example of the data transmission system includes an original base station 3101 configured to maintain transmission of data of a UE 3102 in a handover process in which the UE 3102 hands over from the original base station 3101 to a target base station 3103; the UE 3102 configured to maintain the transmission of the data of the UE 3102 between the UE 3102 and the original base station 3101 in the handover process in which the UE 3102 hands over from the original base station 3101 to the target base station 3103, wherein the original base station 3101 is further configured to transmit the data to the target base station 3103 when maintaining the transmission of the data of the UE 3102; and the target base station 3103 configured to receive the data of the UE 3102 transmitted from the original base station 3101 in the handover process in which the UE 3102 hands over from the original base station 3101 to the target base station 3103.

In the embodiment, the original base station 3101, the UE 3102, the target base station 3103 may be the original base station, the UE, and the target base station described in the embodiments in FIG. 1 to FIG. 30, respectively. Implementations of the original base station 3101, the UE 3102, the target base station 3103 may be similar to those in the embodiments shown in FIG. 1 to FIG. 30, same technical effects may be obtained, and repeated descriptions thereof are not provided herein.

It should be understood that, in the several embodiments provided in the present disclosure, the disclosed device and method can be implemented in other ways. The apparatus embodiments described above are only illustrative. For example, a division of a unit may be only one logical functional division. There may be other divisions in actual implementations, e.g., multiple units and components can be combined or integrated in another system, or some features may be omitted or not executed. Additionally, couplings, or direct couplings, or communication connections between displayed or discussed components may be via some interfaces, and indirect couplings or communication connections between devices or units may be electrical, mechanical or other forms of connections.

The functional units described in the embodiments of the present disclosure may be integrated in one processing units or may be separated physically, or two or more of the units may be integrated in one unit. The above integrated units may be implemented by hardware, or a functional unit including hardware and software.

The above integrated units implemented by the functional unit including software may be stored in a computer readable storage medium. The computer readable storage medium storing functional units including software may include instructions for causing a computing device (which may be a personal computer, a server, a network device or the like) to perform some or parts of the method of the embodiments of the present disclosure. The storage medium may include mediums capable of storing codes, such as a USB disk, a removable disk, a Read Only Memory (ROM), a Random Access Memory (RAM), a Magnetic Disk, a Compact Disk, or the like.

The above described embodiments are optional embodiments of the present disclosure. It should be noted that numerous modifications and embellishments may be made by one of ordinary skills in the art without departing from the spirit of the present disclosure, and such modifications and embellishments also fall within the scope of the present disclosure.

What is claimed is:

1. A data transmission method, comprising:
maintaining transmission of data of a User Equipment (UE) by an original base station in a handover process in which the UE hands over from the original base station to a target base station: and
transmitting the data to the target base station by the original base station when maintaining the transmission of the data of the UE,
wherein the data comprises a downlink data packet and/or an uplink data packet,
in a case that the data comprises the downlink data packet the method further comprises transmitting a value of a current Hyperframe Number (HFN) of the downlink data packet to the target base station by the original base station, wherein the value of the HFN of the downlink data packet transmitted from the original base station to the target base station is used to determine, by the target base station according to the value of the HFN of the downlink data packet and the downlink data packet transmitted by the original base station, a value of a HFN of a subsequent downlink data packet to be transmitted to the UE,
in a case that the data comprises the uplink data packet, the method further comprises transmitting a value of a current Hyperframe Number (HFN) of the uplink data packet to the target base station by the original base station, wherein the value of the HFN of the uplink data packet transmitted from the original base station to the target base station is used to determine, by the target base station according to the value of the HFN of the uplink data packet and the uplink data packet transmitted by the original base station, a value of a HFN of a subsequent uplink data packet to be transmitted from the UE.

2. The method according to claim 1, wherein, in a case that the data comprises the downlink data packet, maintaining the transmission of the data of the UE by the original base station comprises: transmitting the downlink data packet to the UE by the original base station;
transmitting the data to the target base station by the original base station when maintaining the transmission of the data of the UE, comprises: transmitting the downlink data packet to the target base station by the original base station when transmitting the downlink data packet to the UE.

3. The method according to claim 1, wherein, in a case that the data comprises the uplink data packet, the maintaining transmission of data of a UE by an original base station comprises: transmitting the uplink data packet to a gateway device by the original base station;
transmitting the data to the target base station by the original base station when maintaining the transmission of the data of the UE comprises: transmitting the uplink data packet to the target base station by the original base station when transmitting the uplink data packet to the gateway device.

4. The method according to claim 3, wherein, the uplink data packet transmitted from the original base station to the target base station is used to generate a Packet Data Convergence Protocol (PDCP) status report by the target base station according to the uplink data packet received by the target base station when a connection between the target base station and the UE is established successfully, and the PDCP status report is sent to the UE by the target base station.

5. The method according to claim 1, further comprising:
generating a Serial Number (SN) status report of the downlink data packet of the UE by the original base station when the original base station stops transmission of downlink data packets of the UE, and sending the SN status report to the target base station, wherein the SN status report comprises information about a PDCP SN to be assigned to a downlink data packet of the UE by the target base station.

6. The method according to claim 1, further comprising:
generating, by the original base station, a SN status report of the uplink data packet of the UE when the original base station stops transmission of uplink data packets of the UE, and sending the SN status report to the target base station, wherein the SN status report comprises a receiving state of the uplink data packet of the UE and an expected value of a HFN of a uplink data packet from the UE.

7. The method according to claim 6, further comprising:
stopping transmission of the uplink data packets of the UE to the gateway device by the original base station when the original base station stops transmission of the uplink data packets of the UE by the original base station.

8. A data transmission method, comprising:
maintaining transmission of data of a User Equipment (UE) between an original base station and the UE by the UE in a handover process in which the UE hands over from the original base station to a target base station, wherein when the UE maintains the transmission of the data of the UE between the original base station and the UE, the original base station transmits the data of the UE to the target base station,
wherein the data comprises a downlink data packet and/or an uplink data packet,
in a case that the data comprises the downlink data packet, a value of a Hyperframe Number (HFN) of a subsequent downlink data packet transmitted from the target base station and received by the UE is determined by the target base station according to a value of a current HFN of the downlink data packet transmitted by the original base station and the downlink data packet transmitted by the original base station,
in a case that the data comprises the uplink data packet, a value of a Hyperframe Number (HFN) of a subsequent uplink data packet transmitted from the UE to the target base station is determined by the target base station according to a value of a HFN of the unlink data packet transmitted by the original base station and the uplink data packet transmitted by the original base station.

9. A data transmission method, comprising:
receiving, by a target base station, data of a User Equipment (UE) transmitted by an original base station in a handover process in which the UE hands over from the original base station to the target base station, wherein, the original base station maintains transmission of the data of the UE when the target base station receives the data of the UE transmitted by the original base station,
wherein the data comprises a downlink data packet and/or an uplink data packet,
in a case that the data comprises the downlink data packet, the method further comprises receiving, by the target base station, a value of a current Hvperframe Number (HFN) of the downlink data packet transmitted from the original base station, and determining, by the target base station according to the value of the HFN of the downlink data packet transmitted from the original base station and the downlink data packet transmitted from the original base station, a value of a HFN of a subsequent downlink data packet to be transmitted to the UE;
in a case that the data comprises the uplink data packet, the method further comprises receiving, by the target base station, a value of a current Hyperframe Number (HFN) of the uplink data packet transmitted from the original base station, and determining, by the target base station according to the value of the HEN of the uplink data packet transmitted from the original base station and the uplink data packet transmitted from the original base station, a value of a HFN of a subsequent uplink data packet to be transmitted from the UE.

10. The method according to claim 9, wherein, in a case that the data comprises the downlink data packet, receiving, by the target base station, the data of the UE transmitted by the original base station, comprises:
receiving, by the target base station, the downlink data packet transmitted from the original base station, wherein the original base station transmits the downlink data packet to the UE when the target base station receives the downlink data packet transmitted from the original base station.

11. The method according to claim 9, wherein, in a case that the data comprises the uplink data packet, receiving, by the target base station, the data of the UE transmitted by the original base station, comprises:
receiving, by the target base station, the uplink data packet transmitted from the original base station, wherein the original base station transmits the uplink data packet to a gateway device when the target base station receives the uplink data packet transmitted from the original base station.

12. The method according to claim 9, further comprising:
receiving, by the target base station, a Serial Number (SN) status report sent from the original base station when the original base station stops transmission of downlink data packets of the UE, wherein the SN status report is a SN status report of the downlink data packet of the UE generated by the original base station, and comprises information about a PDCP SN of a downlink data packet of the UE to be assigned by the target base station.

13. The method according to claim 9, further comprising:
receiving, by the target base station from the UE, a value of a Serial Number (SN) and/or a value of a HFN of a current first downlink PDCP PDU not received by the UE, wherein the first downlink PDCP PDU not received by the UE is a first PDU not received by the UE after a connection between the UE and the target base station is successfully established.

14. A base station, the base station being an original base station and comprising:
a processor, a transceiver, a storage, a user interface and a bus interface, wherein the transceiver is configured to transmit and receive data under a control of the processor, and the processor is configured to read programs stored in the storage and execute the method according to claim 1.

15. A User Equipment (UE), comprising:
a processor, a transceiver, a storage, a user interface and a bus interface, wherein the transceiver is configured to transmit and receive data under a control of the processor, and the processor is configured to read programs stored in the storage and execute the method according to claim 8.

16. A base station, the base station being a target base station and comprising:

a processor, a transceiver, a storage, a user interface and a bus interface, wherein the transceiver is configured to transmit and receive data under a control of the processor, and the processor is configured to read programs stored in the storage and execute the method according to claim 9.

* * * * *